(12) United States Patent
Suzuki et al.

(10) Patent No.: US 7,935,756 B2
(45) Date of Patent: May 3, 2011

(54) HYDROGENATED BLOCK COPOLYMER AND COMPOSITION THEREOF

(75) Inventors: Katumi Suzuki, Tokyo (JP); Shigeru Sasaki, Tokyo (JP); Takahiro Hisasue, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 563 days.

(21) Appl. No.: 11/884,795

(22) PCT Filed: Feb. 20, 2006

(86) PCT No.: PCT/JP2006/302974
§ 371 (c)(1),
(2), (4) Date: Aug. 21, 2007

(87) PCT Pub. No.: WO2006/088187
PCT Pub. Date: Aug. 24, 2006

(65) Prior Publication Data
US 2008/0161485 A1  Jul. 3, 2008

(30) Foreign Application Priority Data

Feb. 21, 2005 (JP) .................. 2005-043331
Dec. 22, 2005 (JP) .................. 2005-370133

(51) Int. Cl.
*B60C 1/00* (2006.01)
*C08F 36/00* (2006.01)

(52) U.S. Cl. ..................... 524/575; 525/332.9
(58) Field of Classification Search .......... 524/575; 525/332.9
See application file for complete search history.

(56) References Cited

U.S. PATENT DOCUMENTS

| | | | |
|---|---|---|---|
| 3,792,127 A | 2/1974 | Gillies | |
| 5,346,964 A * | 9/1994 | Shibata et al. | 525/314 |
| 5,527,753 A | 6/1996 | Engel et al. | |
| 5,708,092 A | 1/1998 | Schwindeman et al. | |

FOREIGN PATENT DOCUMENTS

| | | |
|---|---|---|
| EP | 0 471 999 A2 | 2/1992 |
| GB | 2 241 239 | 8/1991 |
| JP | 42-8704 | 4/1942 |
| JP | 43-6636 | 3/1943 |
| JP | 63-4841 | 2/1988 |
| JP | 1-37970 | 8/1989 |
| JP | 1-53851 | 11/1989 |
| JP | 2-9041 | 2/1990 |
| JP | 2-158643 | 6/1990 |
| JP | 2-158673 | 6/1990 |
| JP | 6-287365 | 10/1994 |
| JP | 7-118335 | 5/1995 |
| JP | 7-238111 | 9/1995 |
| JP | 8-109219 | 4/1996 |
| JP | 2005-126485 | 5/2005 |
| JP | 2005-255856 | 9/2005 |
| JP | 2006-051632 | 2/2006 |
| WO | 98/12240 | 3/1998 |
| WO | 03-035705 | 5/2003 |
| WO | 2004-003027 | 1/2004 |

OTHER PUBLICATIONS

PDMS properties—Prepared at the 69th JECFA (2008), published in FAO JECFA Monographs 5 (2008), superseding specifications prepared at the $37^{th}$ JECFA (1990), published in the Combined Compendium of Food Additive Specifications, FAO JECFA Monographs 1 (2005). A temporary ADI of 0-0.8 mg/kg bw was established at the 69th JECFA (2008).*
European Search Report for corresponding European Application No. 06 71 4114, mailed on Oct. 8, 2010.
I.M. Kolthoff, et al. "Determination of Polystyrene in GR-S Rubber" J. Polym. Sci, 1, pp. 429-433 (1946).
Y. Tanaka, et al., "Determination of Sequence Distribution in Styrene-Butadiene Copolymer, I $^1$ H-NMR Study of Styrene Oligomers" Rubber Chemistry and Technology 54, pp. 685-691 (Mar. 17, 1981).

* cited by examiner

*Primary Examiner* — William K Cheung
(74) *Attorney, Agent, or Firm* — Staas & Halsey LLP

(57) ABSTRACT

An object of the present invention is to provide a hydrogenated block copolymer having excellent flexibility, heat resistance, abrasion resistance and surface texture (no stickiness, oil bleeding etc.) and good processability, and a composition thereof. The present invention provides a hydrogenated block copolymer that has therein at least one of each of a vinyl aromatic compound polymer block A, a hydrogenated polymer block B of a random copolymer comprising a conjugated diene and a vinyl aromatic compound, and a hydrogenated polymer block C of a conjugated diene polymer having a vinyl bond content of not less than 30%, the hydrogenated block copolymer having a vinyl aromatic compound content of more than 50 wt % and less than 95 wt %, and a composition containing the hydrogenated block copolymer.

24 Claims, No Drawings

HYDROGENATED BLOCK COPOLYMER AND COMPOSITION THEREOF

CROSS REFERENCE TO RELATED APPLICATIONS

This application is based of PCT Application No. PCT/JP2006/302974 filed Feb. 20, 2006, and Japanese Application No(s). 2005-043331 filed Feb. 21, 2005 and 2005-370133 filed Dec. 22, 2005, which are incorporated herein by reference in their entirety into this application.

TECHNICAL FIELD

The present invention relates to a hydrogenated block copolymer having a specified structure, and a hydrogenated block copolymer composition in which this hydrogenated block copolymer is combined with a rubber-softening agent and another thermoplastic resin or rubbery polymer. The composition of the present invention has excellent flexibility, heat resistance, abrasion resistance and surface texture (no stickiness, oil bleeding etc.) and good processability, whereby there can be provided various moldings used for packaging materials for household electrical equipment or industrial parts, toys, automobile parts, medical equipment, or the like.

BACKGROUND ART

For a block copolymer comprising a conjugated diene and a vinyl aromatic hydrocarbon, in the case that the vinyl aromatic hydrocarbon content is relatively low, then even if not vulcanized, the block copolymer has a similar elasticity at ordinary temperature to a vulcanized natural rubber or synthetic rubber, and moreover at high temperature has a processability similar to a thermoplastic resin; such block copolymers are thus widely used in fields such as footwear, plastic modification, asphalt modification, and adhesives. On the other hand, in the case that the vinyl aromatic hydrocarbon content is relatively high, a thermoplastic resin that is transparent and has excellent impact resistance is obtained; such block copolymers are thus used for food packaging containers, household goods, packaging materials for household electrical equipment or industrial parts, toys, and so on. Furthermore, hydrogenated products of such copolymers have excellent weather resistance and heat resistance, and hence are widely used in the above fields of application, and also for automobile parts, medical equipment, and so on.

However, a block copolymer having a relatively low vinyl aromatic hydrocarbon content, despite having good flexibility, has the drawback that the abrasion resistance is poor, and hence there are constraints in terms of further expanding the applications thereof. On the other hand, conventional block copolymers having a relatively high vinyl aromatic hydrocarbon content have poor flexibility, and hence have not been suitable as soft materials.

As a flexible material, there has been disclosed a composition comprising a polypropylene resin, and a hydrogenated diene copolymer obtained by hydrogenating a copolymer that is a random copolymer having a vinyl aromatic hydrocarbon content of from 3 to 50 wt %, has a molecular weight distribution (Mw/Mn) of not more than 10, and has a vinyl bond content in the diene portion of the copolymer in a range of from 10 to 90% (see, for example, Patent Document 1: Japanese Patent Application Laid-open No. 2-158643). Moreover, there has also been disclosed a composition comprising a polypropylene resin, and a hydrogenated diene copolymer obtained by hydrogenating a copolymer that is a random copolymer having a vinyl aromatic hydrocarbon content of from 5 to 60 wt %, and has a vinyl bond content in the diene portion of the copolymer of not less than 60% (see, for example, Patent Document 2: Japanese Patent Application Laid-open No. 6-287365).

There have been attempts to use such hydrogenated diene copolymers in applications in which soft vinyl chloride resins have been conventionally used. For soft vinyl chloride resins, there are worries over problems with the halogen upon burning, the environmental problem of environmental hormones due to plasticizers, and so on, and hence the development of alternative materials is an urgent task. However, hydrogenated diene copolymers such as the above have not had adequate properties in terms of flexibility and abrasion resistance to be used in applications in which soft vinyl chloride resins have been conventionally used.

In recent years, from among block copolymers having a relatively high vinyl aromatic hydrocarbon content, there have been attempts to obtain flexible materials, and a molding material having as its base a hydrogenated block copolymer comprising a copolymer containing a block composed mainly of styrene and a block composed mainly of butadiene/styrene (see, for example, Patent Document 3: WO 98/12240) has been disclosed. However, the hydrogenated copolymer disclosed therein is lacking in flexibility, and hence has not been suitable for applications in which a soft vinyl chloride resin has been used.

In this way, even though there is an urgent need to develop materials as alternatives to soft vinyl chloride resins for which there are various environmental problems, the current state of affairs is that a material having properties (flexibility, abrasion resistance, etc.) comparable with those of a soft vinyl chloride resin has not been obtained.

The present inventors have carried out development of alternative materials to soft vinyl chloride resins, and have previously developed a hydrogenated copolymer having flexibility and abrasion resistance comparable to those of soft vinyl chloride resins (see, for example, Patent Document 4: WO 03/35705). However, the emergence of a material having better heat resistance than that copolymer has been desired.

SUMMARY

It is an object of the present invention to provide a hydrogenated block copolymer having excellent flexibility, heat resistance, abrasion resistance and surface texture (no stickiness, oil bleeding etc.) and good processability, and a composition thereof.

The present inventors carried out assiduous studies to solve the above problem, and as a result accomplished the present invention upon discovering that a hydrogenated block copolymer that has therein at least one of each of a vinyl aromatic compound polymer block A, a hydrogenated polymer block B of a random copolymer comprising a conjugated diene and a vinyl aromatic compound, and a hydrogenated polymer block C of a conjugated diene polymer having a vinyl bond content of not less than 30%, and has a vinyl aromatic compound content of more than 50 wt % and less than 95 wt % effectively solves the above problem, and moreover that a specified composition containing this hydrogenated block copolymer also displays similar effects.

That is, the present invention relates to a hydrogenated block copolymer that is a hydrogenated material of a copolymer comprising a conjugated diene and a vinyl aromatic compound and is characterized by having the following properties (1) to (6), and a composition containing this hydrogenated block copolymer.

(1) The hydrogenated block copolymer has therein at least one of each of following polymer blocks a, b, and c:
  a. a vinyl aromatic compound polymer block A,
  b. a hydrogenated polymer block B of a random copolymer comprising a conjugated diene and a vinyl aromatic compound, and
  c. a hydrogenated polymer block C of a conjugated diene polymer having a vinyl bond content of not less than 30%.

(2) The hydrogenated block copolymer has a vinyl aromatic compound content of more than 50 wt % and less than 95 wt %.

(3) The hydrogenated block copolymer has a weight average molecular weight in a range of from 50,000 to 1,000,000.

(4) The vinyl bond content of conjugated diene monomer units constituting the polymer of the hydrogenated polymer block B before hydrogenation is not less than 10% and less than 20%.

(5) The double bond hydrogenation ratio of the conjugated diene monomer units is not less than 75%.

(6) The hydrogenated block copolymer has the vinyl aromatic compound polymer block A content in a range of from 20 to 50 wt %, the hydrogenated copolymer block B content in a range of from 30 to 80 wt %, and the hydrogenated polymer block C content in a range of from 10 to 35 wt %.

The hydrogenated block copolymer of the present invention or a composition containing the same has excellent flexibility, heat resistance, abrasion resistance and surface texture, and good processability, and can thus be suitably used as an alternative material to a soft vinyl chloride resin in applications such as for a packaging material for household electrical equipment or industrial parts, or for toys, automobile parts, medical equipment, or the like.

DETAILED DESCRIPTION

Following is a detailed description of a preferred embodiment of the present invention.

A hydrogenated block copolymer of the present invention is a hydrogenated material of a copolymer comprising a conjugated diene and a vinyl aromatic compound.

The hydrogenated block copolymer of the present invention has at least one, preferably at least two, of a vinyl aromatic compound polymer block A (hereinafter sometimes referred to as the "polymer block A"), and has therein at least one of each of a hydrogenated copolymer block B of a random copolymer comprising a conjugated diene and vinyl aromatic compound, and a hydrogenated polymer block C of a conjugated diene polymer having a vinyl bond content of not less than 30%.

In the hydrogenated block copolymer of the present invention, the polymer block A is important from the viewpoint of heat resistance and surface texture (no stickiness). The polymer block A content is preferably not less than 20 wt % from the viewpoint of heat resistance and surface texture, and not more than 50 wt % from the viewpoint of flexibility. In the case of obtaining a hydrogenated block copolymer having good heat resistance in particular, the polymer block A content is recommended to be in a range of from 25 to 50 wt %, preferably from 30 to 50 wt %. Moreover, in the case of obtaining a hydrogenated block copolymer having good flexibility in particular, the polymer block A content is recommended to be in a range of from 20 to 45 wt %, preferably from 20 to 40 wt %.

In the present invention, the polymer block A content can be measured using a method in which the copolymer before hydrogenation is subjected to oxidative decomposition using tertiary-butyl hydroperoxide with osmium tetroxide as a catalyst (the method described in I. M. Kolthoff et al., J. Polym. Sci. 1, 429 (1946); hereinafter referred to as the "osmium tetroxide degradation method"). Alternatively, the polymer block A content may be measured using a nuclear magnetic resonance apparatus (NMR) (the method described in Y. Tanaka et al., Rubber Chemistry and Technology, 54, 685 (1981); hereinafter referred to as the "NMR method") taking the copolymer before hydrogenation or the copolymer after hydrogenation as a sample. In this case, the polymer block A content measured using the copolymer before hydrogenation through the osmium tetroxide degradation method ("Os"), and the polymer block A content measured using the copolymer after hydrogenation through the NMR method ("Ns") are related to one another as shown in the following formula (F).

$$(Os)=-0.012(Ns)^2+1.8(Ns)-13.0 \tag{F}$$

Accordingly, in the present invention, in the case of determining the polymer block A content for the block copolymer after hydrogenation using the NMR method, the value of Os calculated from formula (F) is taken as being the polymer block A content stipulated in the present invention.

The hydrogenated block copolymer of the present invention has therein at least one hydrogenated copolymer block B of a random copolymer comprising a conjugated diene and a vinyl aromatic compound. Moreover, a hydrogenated material having substantially no crystallization peak due to the hydrogenated copolymer block B in a range of from −20 to 80° C. in a differential scanning calorimetry (DSC) chart is preferable. Here, "having substantially no crystallization peak due to the hydrogenated polymer block B in a range of from −20 to 80° C." means that a peak due to crystallization of the hydrogenated copolymer block B portion does not arise in this temperature range, or else in the case that a peak due to such crystallization is seen, the crystallization peak heat quantity due to this crystallization is less than 3 J/g, preferably less than 2 J/g, more preferably less than 1 J/g, particularly preferably zero.

Such a hydrogenated block copolymer having no crystallization peak due to the hydrogenated copolymer block B in a range of from −20 to 80° C. has good flexibility, and is suitable for use in applications in which soft vinyl chloride resins have been used. To obtain such a hydrogenated block copolymer having substantially no crystallization peak due to the hydrogenated copolymer block B in a range of from −20 to 80° C., it is preferable to carry out the hydrogenation using a non-hydrogenated copolymer obtained by carrying out polymerization under conditions as described later using a regulator that regulates the vinyl bond content or regulates the random copolymerization properties between the conjugated diene compound and the vinyl aromatic compound as described later.

The hydrogenated copolymer block B content is preferably in a range of from 30 to 80 wt % from the viewpoint of abrasion resistance. This content is more preferably in a range of from 35 to 70 wt %, particularly preferably from 40 to 60 wt %. In the present invention, the weight ratio between the conjugated diene and the vinyl aromatic compound in the random copolymer constituting the hydrogenated copolymer block B is recommended to be in a range of from 50/50 to 10/90, preferably from 40/60 to 15/85, more preferably from 35/65 to 20/80.

In the present invention, the microstructure (cis, trans, vinyl ratio) of the conjugated diene portion in the polymer block before hydrogenation of the hydrogenated copolymer block B can be changed as desired through use of a polar compound or the like as described later; in general, in the case of using 1,3-butadiene as the conjugated diene, from the viewpoint of abrasion resistance, the 1,2-vinyl bond content is in a range of from 10 to 20%.

In the hydrogenated block copolymer of the present invention, the conjugated diene vinyl bond content before hydrogenation of the hydrogenated polymer block C is not less than 30% from the viewpoint of flexibility and surface texture (no oil bleeding etc.). This content is preferably in a range of from 35 to 80%, more preferably from 39 to 75%, particularly preferably from 43 to 70%. In the present invention, the total amount of 1,2-vinyl bonds and 3,4-vinyl bonds (the 1,2-vinyl bond content in the case of using 1,3-butadiene as the conjugated diene, the 3,4-vinyl bond content in the case of using isoprene as the conjugated diene) is hereinafter referred to as the "vinyl bond content". The vinyl bond content can be ascertained through measurement using an infrared spectrophotometer (e.g. the Hampton method) taking the copolymer before hydrogenation as a sample.

Moreover, the hydrogenated polymer block C content in the hydrogenated block copolymer of the present invention is preferably in a range of from 10 to 35 wt % from the viewpoint of flexibility, abrasion resistance and surface texture (no oil bleeding etc.). This content is more preferably in a range of from 13 to 30 wt %.

In the present invention, the vinyl aromatic compound content of the hydrogenated block copolymer is more than 50 wt % and less than 95 wt % from the viewpoint of flexibility, heat resistance, abrasion resistance and so on. This content is preferably in a range of from 55 to less than 90 wt %, more preferably from 58 to 85 wt %. In the present invention, the vinyl aromatic compound content of the hydrogenated block copolymer can be ascertained using an ultraviolet spectrophotometer, taking either the block copolymer before hydrogenation or the block copolymer after hydrogenation as a sample.

The weight average molecular weight of the hydrogenated block copolymer of the present invention is in a range of from 50,000 to 1,000,000 from the viewpoint of the balance between heat resistance, mechanical strength, abrasion resistance and so on, and moldability. The weight average molecular weight is recommended to be preferably from 100,000 to 700,000, more preferably from 150,000 to 500,000.

In the present invention, the molecular weight distribution is not more than 10, generally in a range of from 1 to 8, preferably from 1.01 to 5. For the molecular weight of the hydrogenated block copolymer, measurement is carried out by gel permeation chromatography (GPC), and the weight average molecular weight is determined from the peak molecular weight in the chromatogram using a calibration curve obtained from measurement on commercially available standard polystyrenes (the calibration curve being created using the peak molecular weights of the standard polystyrenes). The molecular weight distribution of the hydrogenated block copolymer can be similarly determined from the measurement by GPC, and is the ratio between the weight average molecular weight and the number average molecular weight.

The hydrogenated block copolymer of the present invention is a hydrogenated material of a block copolymer comprising a conjugated diene and a vinyl aromatic compound, and from the viewpoint of heat resistance, abrasion resistance and surface texture, not less than 75%, preferably not less than 80%, more preferably not less than 85%, particularly preferably not less than 90%, of the double bonds from the conjugated diene compound in the copolymer are hydrogenated. Note that there are no particular limitations on the hydrogenation ratio of aromatic double bonds from the vinyl aromatic hydrocarbon in the hydrogenated block copolymer, but this hydrogenation ratio is preferably not more than 50%, more preferably not more than 30%, yet more preferably not more than 20%. The hydrogenation ratio of the hydrogenated copolymer can be ascertained using a nuclear magnetic resonance apparatus (NMR).

In the present invention, there are no particular limitations on the structure of the hydrogenated block copolymer, it being possible to use a hydrogenated block copolymer having any structure. Examples of hydrogenated copolymers comprising at least one, preferably at least two, of the polymer blocks A, at least one of the hydrogenated copolymer block B, and at least one of the hydrogenated polymer block C are ones having structures represented by the following general formulae.

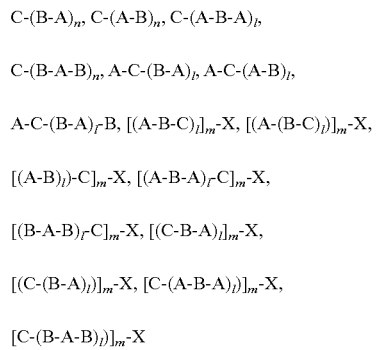

(In the above formulae, A is a polymer block composed mainly of a vinyl aromatic compound, B is a hydrogenated copolymer block of a random copolymer comprising a conjugated diene and a vinyl aromatic compound, and C is a hydrogenated polymer block of a polymer composed mainly of a conjugated diene. The boundaries between blocks are not necessarily clearly defined. The vinyl aromatic hydrocarbon in the hydrogenated copolymer block B comprising the random copolymer may be distributed uniformly, or may be distributed in tapered fashion. Moreover, the block B may comprise a mixture of a plurality of portions in which the vinyl aromatic hydrocarbon is distributed uniformly and/or portions in which the vinyl aromatic hydrocarbon is distributed in tapered fashion. Moreover, the block B may comprise a plurality of segments having different vinyl aromatic hydrocarbon contents to one another. Moreover, l represents an integer of 1 or more, preferably from 1 to 5, and n represents an integer of 2 or more, preferably from 2 to 5. m represents an integer of 2 or more, preferably from 2 to 11. X represents a coupling agent residue, or a polyfunctional initiator residue. In the case that there are a plurality of any of blocks A, blocks B, or blocks C in the copolymer, the structures thereof including the molecular weight and the composition may be the same, or different. Moreover, the structures of the polymer chains bonded to X may be the same, or different.)

Of the above, a copolymer having a structure having a block A at each end thereof is preferable from the viewpoint of heat resistance and mechanical strength, the structure A-C-B-A being particularly preferable.

The hydrogenated block copolymer of the present invention may also be any desired mixture of copolymers having structures represented by general formulae as above. Moreover, the hydrogenated block copolymer may have mixed therein a vinyl aromatic compound polymer, or a copolymer having an A-B structure or a B-A-B structure.

A conjugated diene in the present invention is a diolefin having a pair of conjugated double bonds, examples including 1,3-butadiene, 2-methyl-1,3-butadiene (isoprene), 2,3-dimethyl-1,3-butadiene, 1,3-pentadiene, 2-methyl-1,3-pentadiene and 1,3-hexadiene, with 1,3-butadiene and isoprene being particularly typical. One of these may be used alone, or two or more may be used. Moreover, examples of a vinyl aromatic compound include styrene, □-methylstyrene, p-methylstyrene, divinylbenzene, 1,1-diphenylethylene, N,N-dimethyl-p-aminoethylstyrene and N,N-diethyl-p-aminoethylstyrene; one of these may be used alone, or two or more may be used.

In the present invention, the copolymer before hydrogenation may be obtained, for example, by living anionic polymerization using an initiator such as an organic alkali metal compound in a hydrocarbon solvent. Examples of the hydrocarbon solvent include aliphatic hydrocarbons such as n-butane, isobutane, n-pentane, n-hexane, n-heptane and n-octane, alicyclic hydrocarbons such as cyclohexane, cycloheptane and methylcycloheptane, and aromatic hydrocarbons such as benzene, toluene, xylene and ethylbenzene.

Moreover, examples of the initiator include aliphatic hydrocarbon-alkali metal compounds, aromatic hydrocarbon-alkali metal compounds, and organic amino-alkali metal compounds that are generally known to have an anionic polymerization activity for conjugated diene compounds and vinyl aromatic compounds, examples of the alkali metal including lithium, sodium and potassium. Preferable organic alkali metal compounds are C1-20 aliphatic and aromatic hydrocarbon-lithium compounds, these including compounds containing one lithium in one molecule thereof, and dilithium compounds, trilithium compounds and tetralithium compounds containing a plurality of lithiums in one molecule thereof. Specific examples include n-propyllithium, n-butyllithium, sec-butyllithium, tert-butyllithium, n-pentyllithium, n-hexyllithium, benzyllithium, phenyllithium, tolyllithium, a reaction product between diisopropenylbenzene and sec-butyllithium, and a reaction product between divinylbenzene, sec-butyllithium and a small amount of 1,3-butadiene.

Furthermore, it is also possible to use an organic alkali metal compound disclosed in U.S. Pat. No. 5,708,092, GB Patent No. 2,241,239, U.S. Pat. No. 5,527,753 or the like.

In the present invention, when copolymerizing the conjugated diene compound and the vinyl aromatic compound using an organic alkali metal compound as a polymerization initiator, a tertiary amine compound or an ether compound may be added as a regulator for regulating the amount of vinyl bonds (1,2- or 3,4-bonds) from the conjugated diene compound incorporated in the polymer or for adjusting the random copolymerization properties between the conjugated diene compound and the vinyl aromatic compound. A tertiary amine compound is a compound represented by the general formula $R^1R^2R^3N$ (wherein each of $R^1$, $R^2$, and $R^3$ represents a C1-20 hydrocarbon group or tertiary amino group-possessing hydrocarbon group). Examples include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine and N,N'-dioctyl-p-phenylenediamine.

Moreover, an ether compound is selected from straight chain ether compounds and cyclic ether compounds. Examples of straight chain ether compounds include dimethyl ether, diethyl ether, diphenyl ether, ethylene glycol dialkyl ether compounds such as ethylene glycol dimethyl ether, ethylene glycol diethyl ether and ethylene glycol dibutyl ether, and diethylene glycol dialkyl ether compounds such as diethylene glycol dimethyl ether, diethylene glycol diethyl ether and diethylene glycol dibutyl ether. Moreover, examples of cyclic ether compounds include tetrahydrofuran, dioxane, 2,5-dimethyloxolane, 2,2,5,5-tetramethyloxolane, 2,2-bis(2-oxolanyl)propane, and alkyl ethers of furfuryl alcohol.

In the present invention, the method of copolymerizing the conjugated diene compound and the vinyl aromatic compound using an organic alkali metal compound as a polymerization initiator may be batch polymerization or continuous polymerization, or a combination of these. To obtain a copolymer having excellent heat resistance in particular, a batch polymerization method is recommended. The polymerization temperature is generally in a range of from 0 to 180° C., preferably from 30 to 150° C. The time required for the polymerization depends on the conditions, but is generally not more than 48 hours, particularly preferably in a range of from 0.1 to 10 hours. Moreover, the atmosphere in the polymerization system is preferably made to be an atmosphere of an inert gas such as nitrogen gas. There are no particular limitations on the polymerization pressure so long as the pressure is in a range sufficient for maintaining the monomers and solvent in a liquid phase under the above polymerization temperature range. Furthermore, care must be taken that impurities such as water, oxygen, or carbon dioxide that would deactivate the catalyst or the living polymer do not get into the polymerization system.

In the present invention, once the polymerization has been completed, a coupling reaction may be carried out by adding a required amount of a bifunctional or higher coupling agent. There are no particular limitations on a bifunctional coupling agent, any publicly known one being usable. Examples include dihalogen compounds such as dimethyldichlorosilane and dimethyldibromosilane, and acid esters such as methyl benzoate, ethyl benzoate, phenyl benzoate, and phthalic acid esters. Moreover, there are no particular limitations on a trifunctional or higher coupling agent, any publicly known one being usable. Examples trihydric or higher alcohol, polyvalent epoxy compounds such as epoxidized soybean oil and diglycidyl bisphenol A, and polyhalogenated compounds such as halogenated silicon compounds represented by the general formula $R_{4-n}SiX_n$ (wherein R represents a C1-20 hydrocarbon group, X represents a halogen, and n represents an integer of 3 or 4) such as methylsilyl trichloride, t-butylsilyl trichloride, silicon tetrachloride, and brominated versions thereof, and halogenated tin compounds represented by the general formula $R_{4-n}SnX_n$ (wherein R represents a C1-20 hydrocarbon group, X represents a halogen, and n represents an integer of 3 or 4) such as methyltin trichloride, t-butyltin trichloride and tin tetrachloride. Dimethyl carbonate, diethyl carbonate or the like can also be used.

The present invention also includes a modified hydrogenated copolymer in which a functional group-containing atomic group is bonded to a hydrogenated copolymer as above. Examples of the functional group-containing atomic group are atomic groups containing at least one functional group selected from a hydroxyl group, a carbonyl group, a thiocarbonyl group, acid halide groups, acid anhydride groups, a carboxyl group, a thiocarboxyl group, aldehyde groups, thioaldehyde groups, carbonic acid ester groups, amide groups, a sulfonic acid group, sulfonic acid ester groups, a phosphoric acid group, phosphoric acid ester groups, an amino group, an imino group, a nitrile group, a pyridyl group, a quinoline group, an epoxy group, a thioepoxy group, a sulfide group, an isocyanate group, an isothiocyanate group, silicon halide groups, a silanol group, alkoxysilicon groups, tin halide groups, alkoxytin groups, a phenyltin group and so on. A modified hydrogenated block copolymer in which is bonded an atomic group containing at least one functional group selected from a hydroxyl group, an epoxy group, an amino group, a silanol group, and alkoxysilane groups is preferable.

Examples of functional group-containing modifying agents include tetraglycidyl-meta-xylenediamine, tetraglycidyl-1,3-bisaminomethylcyclohexane, □-caprolactone, □-valerolactone, 4-methoxybenzophenone, □-glycidoxyethyltrimethoxysilane, □-glycidoxypropyltrimethoxysilane, □-glycidoxypropyldimethylphenoxysilane, bis(□-glycidoxypropyl)methylpropoxysilane, 1,3-dimethyl-2-imidazolidone, 1,3-diethyl-2-imidazolidone, N,N'-dimethylpropyleneurea, and N-methylpyrrolidone.

The modified hydrogenated block copolymer of the present invention can be obtained by hydrogenating a block copolymer obtained by carrying out an addition reaction of a modifying agent that will produce the functional group-containing atomic group onto the living end of a block copolymer obtained using a method as described above with an organolithium compound as a polymerization catalyst.

In the present invention, the reaction temperature is preferably in a range of from 0 to 150° C., more preferably from 20 to 120° C. The time required for the modification reaction depends on the other conditions, but is preferably not more than 24 hours, particularly preferably in a range of from 0.1 to 10 hours.

The hydrogenated block copolymer of the present invention is obtained by hydrogenating a block copolymer or modified block copolymer obtained as described above. There are no particular limitations on the hydrogenation catalyst, it being possible to use a conventional publicly known one: (1) a supported heterogeneous hydrogenation catalyst in which a metal such as Ni, Pt, Pd or Ru is supported on carbon, silica, alumina, diatomaceous earth or the like; (2) a so-called Ziegler type hydrogenation catalyst in which are used a transition metal salt such as an organic acid salt or acetylacetone salt of Ni, Co, Fe, Cr or the like, and a reducing agent, such as an organoaluminum; or (3) a homogeneous hydrogenation catalyst such as a so-called oraganometallic complex of an organometallic compound of Ti, Ru, Rh, Zr or the like. Specific hydrogenation catalysts that can be used are those described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, and Japanese Patent Publication No. 2-9041. An example of a preferable hydrogenation catalyst is a mixture of a titanocene compound and/or a reductive organometallic compound.

As the titanocene compound, there can be used as compound described in Japanese Patent Application Laid-open No. 8-109219, specific examples being compounds having at least one ligand and having a (substituted) cyclopentadienyl skeleton, indenyl skeleton or fluorenyl skeleton such as bis-cyclopentadienyltitanium dichloride or monopentamethylcyclopentadienyltitanium trichloride. Moreover, examples of the reductive organometallic compound include organic alkali metal compounds such as organolithium compounds, and organomagnesium compounds, organoaluminum compounds, organoboron compound, and organozinc compounds.

In the present invention, the hydrogenation reaction is generally carried out at a temperature in a range of from 0 to 200° C., more preferably from 30 to 150° C. The pressure of hydrogen used in the hydrogenation reaction is recommended to be in a range of from 0.1 to 15 MPa, preferably from 0.2 to 10 MPa, more preferably from 0.3 to 5 MPa. Moreover, the hydrogenation reaction time is generally in a range of from 3 minutes to 10 hours, preferably from 10 minutes to 5 hours. For the hydrogenation reaction, a batch process, a continuous process, or a combination thereof may be used.

Catalyst residue is removed as required from the hydrogenated block copolymer solution obtained as described above, and then the hydrogenated block copolymer can be separated out from the solution. Examples of methods for separating off the solvent include a method in which a polar solvent such as acetone or an alcohol that is a poor solvent for the hydrogenated block copolymer is added to the reaction solution after the hydrogenation so as to precipitate out the polymer which is then recovered, a method in which the reaction solution is put into hot water while stirring, and the solvent is removed and recovered by steam stripping, and a method in which the solvent is evaporated off by directly heating the polymer solution. Note also that the hydrogenated block copolymer of the present invention may have added thereto any of various stabilizers such as a phenol type stabilizer, a phosphorus type stabilizer, a sulfur type stabilizer, or an amine type stabilizer.

The hydrogenated copolymer of the present invention may be subjected to graft modification using an □,□-unsaturated carboxylic acid or a derivative thereof, for example an anhydride, an ester, an amide or an imide thereof, and thus bonded to a functional group-containing atomic group. Specific examples of such an □,□-unsaturated carboxylic acid or derivative thereof include maleic anhydride, maleic anhydride imide, acrylic acid or an ester thereof, methacrylic acid or an ester thereof, and endo-cis-bicyclo[2,2,1]-5-heptene-2,3-dicarboxylic acid or an anhydride thereof. The amount added of the □,□-unsaturated carboxylic acid or derivative thereof is generally in a range of from 0.01 to 20 parts by weight, preferably from 0.1 to 10 parts by weight, per 100 parts by weight of the hydrogenated polymer.

In the present invention, the reaction temperature in the case of carrying out such graft modification is preferably in a range of from 100 to 300° C., more preferably from 120 to 280° C. For details of the graft modification method, see for example Japanese Patent Application Laid-open No. 62-79211.

The hydrogenated block copolymer of the present invention described above (hereinafter referred to as "component (1)") may be combined with a rubber-softening agent (hereinafter referred to as "component (2)") so as to obtain a hydrogenated block copolymer composition suitable as any of various molding materials.

The rubber-softening agent used in the present invention makes the composition more flexible and gives the composition good processability. Examples of the rubber softening agent are a mineral oil, and a liquid or low-molecular-weight synthetic softening agent; of these, a naphthene type and/or paraffin type process oil or extender oil is preferable. A mineral oil type rubber-softening agent is a mixture of an aromatic ring, a naphthene ring and a paraffin chain; one in which the number of carbons in the paraffin chain is at least 50% of the total number of carbons is referred to as paraffin type, one in which the number of carbons in the naphthene ring is from 30 to 45% of the total number of carbons is referred to as naphthene type, and one in which the number of aromatic carbons is more than 30% of the total number of carbons is referred to as aromatic type. A synthetic softening agent may also be used in the composition, it being possible to use polybutene, low-molecular-weight polybutadiene, liquid paraffin or the like, although a mineral oil type rubber-softening agent as described above is preferable. The amount of the rubber-softening agent included in the composition is in a range of from 5 to 100 parts by weight, preferably from 10 to 80 parts by weight, more preferably from 20 to 60 parts by weight, per 100 parts by weight of the hydrogenated block copolymer. If the amount of the rubber-softening agent exceeds 100 parts by weight, then bleeding out is prone to occur, causing a worsening of the surface texture.

It is recommended that there is at least one tan ☐ (loss tangent) peak in a range of from 0 to 40° C., preferably from 5 to 35° C., more preferably from 10 to 30° C., in the viscoelasticity measurement chart obtained for the hydrogenated block copolymer composition of the present invention comprising the hydrogenated block copolymer and the rubber-softening agent. Such a tan ☐ peak is a peak due to the rubber-softening agent and the hydrogenated polymer block B comprising the random copolymer between the conjugated diene and the vinyl aromatic compound in the polymer chain of the hydrogenated block copolymer. The existence of at least one such peak in a range of from 0 to 40° C. is necessary from the viewpoint of the balance between the abrasion resistance and the flexibility of the hydrogenated copolymer composition. Note that in the present invention, there are no particular limitations on the position of a tan ☐ peak due to the vinyl aromatic compound polymer block A bonded within the polymer chain of the hydrogenated copolymer, but this tan ☐ peak generally exists in a temperature range of from 80 to 150° C.

In addition to the rubber-softening agent (component (2)), the hydrogenated block copolymer (component (1)) of the present invention may also be combined with at least one component selected from the group consisting of thermoplastic resins and rubbery polymers (hereinafter referred to as "component (3)") so as to obtain a hydrogenated block copolymer composition suitable as any of various molding materials. The amount included of component (3) is in a range of from 5 to 100 parts by weight, preferably from 10 to 80 parts by weight, more preferably from 20 to 60 parts by weight, per 100 parts by weight of component (1). If the amount of component (3) is too high, then the flexibility decreases, and the transparency worsens.

In the case of blending the hydrogenated block copolymer composition of the present invention with a thermoplastic resin such as polypropylene, a composition having excellent mechanical properties, heat resistance and so on can be obtained.

Examples of such thermoplastic resins include a block copolymer resin comprising a conjugated diene compound and a vinyl aromatic compound or a hydrogenation product thereof (except this must be different to the hydrogenated block copolymer of the present invention described above), a polymer of a vinyl aromatic compound as described above, a copolymer resin between such a vinyl aromatic compound and another vinyl monomer such as ethylene, propylene, butylene, vinyl chloride, vinylidene chloride, vinyl acetate, acrylic acid or an acrylic acid ester such as methyl acrylate, methacrylic acid or a methacrylic acid ester such as methyl methacrylate, acrylonitrile and methacrylonitrile, a rubber-modified styrene resin (HIPS), an acrylonitrile-butadiene-styrene copolymer resin (ABS), and a methacrylic acid ester-butadiene-styrene copolymer resin (MBS).

Moreover, other examples include a polyethylene resin such as polyethylene, a copolymer between ethylene and another monomer copolymerizable therewith having an ethylene content of not less than 50 wt % such as an ethylene-propylene copolymer, an ethylene-butylene copolymer, an ethylene-hexene copolymer, an ethylene-octene copolymer or an ethylene-vinyl acetate copolymer, or a hydrolysate thereof, an ethylene-acrylic acid ionomer, or a chlorinated polyethylene, a polypropylene resin such as polypropylene, a copolymer between propylene and another monomer copolymerizable therewith having a propylene content of not less than 50 wt % such as a propylene-ethylene copolymer or a propylene-ethyl acrylate copolymer, or a chlorinated polypropylene, a cyclic olefin resin such as an ethylene-norbornene resin, a polybutene resin, a polyvinyl chloride resin, a polyvinyl acetate resin, or a hydrolysate thereof.

Moreover, other examples include a polymer of acrylic acid or an ester or amide thereof, a polyacrylate resin, a polymer of acrylonitrile and/or methacrylonitrile, a nitrile resin that is a copolymer of such an acrylonitrile monomer and another monomer copolymerizable therewith having an acrylonitrile monomer content of not less than 50 wt %, a polyamide resin such as nylon-46, nylon-6, nylon-66, nylon-610, nylon-11, nylon-12 or a nylon-6/nylon-12 copolymer, a polyester resin, a thermoplastic polyurethane resin, a polycarbonate polymer such as poly-4,4'-dioxydiphenyl-2,2'-propane carbonate, a thermoplastic polysulfone such as a polyether sulfone or a polyallyl sulfone, a polyoxymethylene resin, a polyphenylene ether resin such as poly(2,6-dimethyl-1,4-phenylene) ether, a polyphenylene sulfide resin such as polyphenylene sulfide or poly-4,4'-diphenylene sulfide, a polyallylate resin, a polyether ketone polymer or copolymer, a polyketone resin, a fluororesin, a polyoxybenzoyl polymer, a polyimide resin, and a polybutadiene resin such as 1,2-polybutadiene or trans-polybutadiene.

Particularly preferable ones of these thermoplastic resins (component (3)) are a styrene resin such as polystyrene or a rubber-modified styrene resin, a polyethylene polymer such as polyethylene, an ethylene-propylene copolymer, an ethylene-propylene-butylene copolymer, an ethylene-butylene copolymer, an ethylene-hexene copolymer, an ethylene-octene copolymer, an ethylene-vinyl acetate copolymer, an ethylene-acrylic acid ester copolymer or an ethylene-methacrylic acid ester copolymer, a polypropylene resin such as polypropylene or a propylene-ethylene copolymer, a polyamide resin, a polyester resin, and a polycarbonate resin. Each of these thermoplastic resins generally has a number average molecular weight of not less than 1000, preferably from 5000 to 5,000,000, particularly preferably from 10,000 to 1,000,000.

Moreover, in the case of blending the hydrogenated block copolymer composition of the present invention with a rubbery polymer, a composition having excellent elongation properties and so on can be obtained.

Examples of such rubbery polymers include a butadiene rubber or a hydrogenation product thereof, a styrene-butadiene rubber or a hydrogenation product thereof (except this must be different to the hydrogenated copolymer of the present invention), an isoprene rubber, an acrylonitrile-butadiene rubber or a hydrogenation product thereof, an olefin type elastomer such as 1,2-polybutadiene, a chloroprene rubber, an ethylene-propylene rubber, an ethylene-propylene-diene rubber (EPDM), an ethylene-butane-diene rubber, an ethylene-butene rubber, an ethylene-hexene rubber or an ethylene-octene rubber, a butyl rubber, an acrylic rubber, a fluororubber, a silicone rubber, and a chlorinated polyethylene rubber.

Moreover, other examples include an epichlorohydrin rubber, an ☐,☐-unsaturated nitrile-acrylic acid ester-conjugated diene copolymer rubber, a urethane rubber, a polysulfide rubber, a styrene type elastomer such as a styrene-butadiene block copolymer or a hydrogenation product thereof, or a styrene-isoprene block copolymer or a hydrogenation product thereof, and a natural rubber.

Preferable ones of these rubbery polymers (component (3)) are a styrene type elastomer such as a styrene-butadiene block copolymer or a hydrogenation product thereof, or a styrene-isoprene block copolymer or a hydrogenation product thereof, an olefin type elastomer such as 1,2-polybutadiene, an ethylene-butene rubber, an ethylene-octene rubber or an ethylene-propylene-diene rubber (EPDM), and a butyl rubber. Each of these rubbery polymers may be a modified rubber given a functional group. Each of these rubbery polymers preferably has a number average molecular weight of not less than 10,000, preferably from 20,000 to 1,000,000, particularly preferably from 30,000 to 800,000.

Moreover, two or more of the above thermoplastic resins and rubbery polymers may be used in combination as required. There are no particular limitations on those used in the case of using in combination, it being possible to use thermoplastic resin components together, or rubbery polymer components together, or a thermoplastic resin and a rubbery polymer together.

Moreover, the present invention provides a hydrogenated block copolymer composition containing the hydrogenated block copolymer according to the present invention described above. This hydrogenated block copolymer composition comprises the hydrogenated block copolymer according to the present invention described above (hereinafter referred to as "component (a)"), a hydrogenated block copolymer different to component (a) (hereinafter referred to as "component (b)"), a thermoplastic resin (hereinafter referred to as "component (c)"), and a rubber-softening agent (hereinafter referred to as "component (d)").

Here, component (b) is a hydrogenated block copolymer obtained by hydrogenating a block copolymer comprising at least two polymer blocks D composed mainly of a vinyl aromatic compound and at least one polymer block E composed mainly of a conjugated diene, and has following properties (7) to (9).

(7) The hydrogenated block copolymer has a total vinyl aromatic compound content in a range of from 10 to 40 wt %, and the proportion of the polymer blocks D composed mainly of the vinyl aromatic compound out of the total vinyl aromatic compound content is not less than 80 wt %.

(8) The hydrogenated block copolymer has a weight average molecular weight in a range of from 200,000 to 600,000.

(9) Not less than 75% of the conjugated diene monomer unit double bonds in the hydrogenated block copolymer are hydrogenated.

As component (b), for example, a hydrogenated block copolymer having a structure represented by a general formula as follows is preferable.

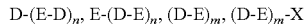

D-(E-D)$_n$, E-(D-E)$_n$, (D-E)$_m$, (D-E)$_m$-X

In the above formulae, D is a polymer block composed mainly of a vinyl aromatic compound, and E is a polymer block composed mainly of a conjugated diene compound. Moreover, n represents an integer of from 2 to 10, m represents an integer of from 2 to 8, and X represents a coupling agent residue or a polyfunctional initiator residue. The hydrogenated block copolymer may have a single such structure, or may be a mixture of ones having different structures or different hydrogenation ratios.

For the hydrogenated block copolymer comprising component (b), the expression "composed mainly of" means the monomer in question accounting for not less than 50%, preferably not less than 70%, of the monomers.

For the hydrogenated block copolymer comprising component (b), the total vinyl aromatic compound content is in a range of from 10 to 40 wt %, preferably from 24 to 36 wt %. Using such a hydrogenated block copolymer for which the total vinyl aromatic compound content is in the range stipulated in the present invention is necessary for obtaining a material having good flexibility and heat resistance.

Moreover, for the hydrogenated block copolymer comprising component (b), the proportion of the polymer blocks D composed mainly of the vinyl aromatic compound out of the total vinyl aromatic compound content is not less than 80 wt %, preferably not less than 85 wt %, more preferably not less than 90 wt %, from the viewpoint of obtaining a material having good mechanical strength.

In the hydrogenated block copolymer comprising component (b), for each polymer block D composed mainly of the vinyl aromatic compound and polymer block E composed mainly of the conjugated diene compound or a hydrogenation product thereof, the distribution of the conjugated diene compound or hydrogenation product thereof or the vinyl aromatic compound in the molecular chain in the polymer block may be random, or tapered (in which the monomer component increases or decreases along the molecular chain), or in partial blocks, or any combination thereof, and moreover in the case that there are a plurality of the polymer blocks D composed mainly of the vinyl aromatic compound or the polymer blocks E composed mainly of the conjugated diene compound or hydrogenation product thereof, these polymer blocks may have the same structure as one another, or different structures.

As the vinyl aromatic compound in the hydrogenated block copolymer comprising component (b), for example at least one may be selected from styrene, □-methylstyrene, vinyltoluene, p-tert-butyl styrene and so on, styrene being preferable out of these. Moreover, as the conjugated diene compound, for example at least one may be selected from butadiene, isoprene, 1,3-pentadiene, 2,3-dimethyl-1,3-butadiene and so on, butadiene, isoprene, or a combination thereof being preferable out of these. Moreover, for the polymer block D composed mainly of the conjugated diene compound or hydrogenation product thereof, the microstructure of the block may be selected as desired, for example in the case of a polybutadiene block before hydrogenation, the 1,2-vinyl bond content may be from 25 to 55 wt %, preferably from 30 to 50 wt %, from the viewpoint of flexibility and softening agent retention.

From the viewpoint of heat resistance, mechanical strength and oil absorption, the weight average molecular weight of the hydrogenated block copolymer comprising component (b) is in a range of from 200,000 to 600,000 in terms of polystyrene, preferably from 220,000 to 500,000, and the molecular weight distribution is not more than 5, generally from 1 to 4, preferably from 1 to 3.

There are no limitations on the method of producing the hydrogenated block copolymer comprising component (b) so long as the hydrogenated block copolymer has a structure as described above; for example, a vinyl aromatic compound-conjugated diene compound block copolymer can be synthesized in an inert solvent using a lithium catalyst by the method described in Japanese Patent Publication No. 40-23798. Moreover, as a method of producing a vinyl aromatic compound-hydrogenated conjugated diene compound block copolymer exhibiting yet more preferable properties, for example the method described in Japanese Patent Publication No. 42-8704 or Japanese Patent Publication No. 43-6636 may be used, although in the case in particular of an application in which good weather resistance and heat aging resistance are required, it is recommended to use a titanium type hydrogenation catalyst, examples being the methods described in Japanese Patent Application Laid-open No. 59-133203 and Japanese Patent Application Laid-open No. 60-79005. In this case, not less than 75%, preferably not less than 80%, more preferably not less than 90%, of the aliphatic double bonds originating from the conjugated diene compound are hydrogenated, most of the conjugated diene compound being converted in form into an olefinic compound. For example, a butadiene polymer block is converted into a polymer block composed mainly of ethylene-butylene.

Moreover, for the hydrogenated block copolymer comprising component (b), there are no particular limitations on the hydrogenation ratio of aromatic double bonds originating from the vinyl aromatic compound obtained by copolymerizing as required the polymer blocks D composed mainly of the vinyl aromatic compound and E composed mainly of the conjugated diene compound or hydrogenation product thereof, but this hydrogenation ratio is preferably not more than 20%.

Next, examples of the thermoplastic resin comprising component (c) will be given, although there are no particular limitations thereto.

Examples of the thermoplastic resin comprising component (c) include a block copolymer resin comprising a conjugated diene compound and a vinyl aromatic compound or a hydrogenation product thereof (except this must be different to the hydrogenated block copolymers of components (a) and (b) according to the present invention described above), a polymer of a vinyl aromatic compound as described above, a copolymer resin between such a vinyl aromatic compound and another vinyl monomer such as ethylene, propylene, butylene, vinyl chloride, vinylidene chloride, vinyl acetate, acrylic acid or an acrylic acid ester such as methyl acrylate, methacrylic acid or a methacrylic acid ester such as methyl methacrylate, acrylonitrile and methacrylonitrile, a rubber-modified styrene resin (HIPS), an acrylonitrile-butadiene-styrene copolymer resin (ABS), a methacrylic acid ester-butadiene-styrene copolymer resin (MBS), a polyethylene resin such as polyethylene, a copolymer between ethylene and another monomer copolymerizable therewith having an ethylene content of not less than 50 wt % such as an ethylene-propylene copolymer, an ethylene-butylene copolymer, an ethylene-hexene copolymer, an ethylene-octene copolymer or an ethylene-vinyl acetate copolymer, or a hydrolysate thereof, an ethylene-acrylic acid ionomer, or a chlorinated polyethylene, a polypropylene resin such as polypropylene, a copolymer between propylene and another monomer copolymerizable therewith having a propylene content of not less than 50 wt % such as a propylene-ethylene copolymer or a propylene-ethyl acrylate copolymer, or a chlorinated polypropylene, a cyclic olefin resin such as an ethylene-norbornene resin, a polybutene resin, a polyvinyl chloride resin, a polyvinyl acetate resin, or a hydrolysate thereof, a polymer of acrylic acid or an ester or amide thereof, a polyacrylate resin, a polymer of acrylonitrile and/or methacrylonitrile, a nitrile resin that is a copolymer of such an acrylonitrile monomer and another monomer copolymerizable therewith having an acrylonitrile monomer content of not less than 50 wt %, a polyamide resin such as nylon-46, nylon-6, nylon-66, nylon-610, nylon-11, nylon-12 or a nylon-6/nylon-12 copolymer, a polyester resin, a thermoplastic polyurethane resin, a polycarbonate polymer such as poly-4,4'-dioxydiphenyl-2,2'-propane carbonate, a thermoplastic polysulfone such as a polyether sulfone or a polyallyl sulfone, a polyoxymethylene resin, a polyphenylene ether resin such as poly(2,6-dimethyl-1,4-phenylene) ether, a polyphenylene sulfide resin such as polyphenylene sulfide or poly-4,4'-diphenylene sulfide, a polyallylate resin, a polyether ketone polymer or copolymer, a polyketone resin, a fluororesin, a polyoxybenzoyl polymer, a polyimide resin, and a polybutadiene resin such as 1,2-polybutadiene or trans-polybutadiene.

Each of these thermoplastic resins generally has a number average molecular weight of not less than 1000, preferably from 5000 to 5,000,000, particularly preferably from 10,000 to 1,000,000. As such a thermoplastic resin comprising component (c), preferable ones are a styrene resin, and an ethylene type or propylene type olefinic resin (PORN), and from the viewpoint of heat resistance, mechanical strength, fluidity (moldability) and versatility, particularly preferable ones are olefinic resins, with a propylene resin being particularly preferable out of these.

The amount included of the thermoplastic resin comprising component (c) is in a range of from 20 to 200 parts by weight, preferably from 25 to 150 parts by weight, more preferably from 30 to 100 parts by weight, per 100 parts by weight in total of the hydrogenated block copolymer comprising component (a) and the hydrogenated block copolymer comprising component (b). Although dependent on the desired rigidity and hardness of the composition, it is undesirable for the amount included of component (c) to be less than 20 parts by weight, since then the heat resistance and fluidity (moldability) of the composition obtained decreases. Conversely, it is undesirable for this amount to exceed 200 parts by weight, since then the flexibility and abrasion resistance of the composition obtained decreases. Moreover, two or more of such thermoplastic resins comprising component (c) may be used in combination as required.

Furthermore, the ratio among the total of 100 parts by weight of component (a) and component (b) is 90 to 10 wt % of component (b) relative to 10 to 90 wt % of component (a).

The rubber-softening agent comprising component (d) gives the composition obtained flexibility, and also fluidity (moldability). Examples of the rubber-softening agent comprising component (d) are a mineral oil, and a liquid or low-molecular-weight synthetic softening agents; of these, a naphthene type and/or paraffin type process oil or extender oil is preferable. A mineral oil type rubber-softening agent is a mixture of an aromatic ring, a naphthene ring and a paraffin chain; one in which the number of carbons in the paraffin chain is at least 50% of the total number of carbons is referred to as paraffin type, one in which the number of carbons in the naphthene ring is from 30 to 45% of the total number of carbons is referred to as naphthene type, and one in which the number of aromatic carbons is more than 30% of the total number of carbons is referred to as aromatic type. A synthetic softening agent may also be used in the composition of the present invention, it being possible to use polybutene, low-molecular-weight polybutadiene, liquid paraffin or the like, although a mineral oil type rubber-softening agent as described above is preferable. In the case that good heat resistance and mechanical properties are required in particular, the kinematic viscosity at 40° C. of the mineral oil type rubber-softening agent is preferably not less than 60 cst, particularly preferably not less than 120 cst.

The amount included of the rubber-softening agent comprising component (d) is in a range of from 20 to 250 parts by weight, preferably from 30 to 230 parts by weight, more preferably from 40 to 200 parts by weight, per 100 parts by weight in total of the components (a) and (b). Although dependent on the desired hardness and fluidity (moldability) of the composition, it is undesirable for the amount included of component (d) to be less than 20 parts by weight, since then the fluidity (moldability) of the composition obtained decreases. Conversely, it is undesirable for this amount to exceed 250 parts by weight, since then the abrasion resistance decreases and stickiness arises in the surface texture. Moreover, two or more of such rubber-softening agents may be used in combination as required.

Furthermore, for the composition of the present invention, a composition having yet better abrasion resistance can be obtained by adding an organopolysiloxane. Such an organopolysiloxane has an excellent effect of modifying the surface of the composition obtained, and hence is used as an abrasion resistance improving auxiliary. There are no particular limitations on the form of the organopolysiloxane, there being from low-viscosity to high-viscosity liquid ones and also solid ones, but from the viewpoint of dispersability in the composition, a liquid one, i.e. a so-called silicone oil, is preferable. Furthermore, from the viewpoint of the surface texture due to bleeding out of the polysiloxane itself, the kinematic viscosity is preferably not less than 90 cst, more preferably not less than 1000 cst. Moreover, there are no particular limitations on the type of the organopolysiloxane, there being general purpose silicone oils such as dimethylpolysiloxane (polydimethylsiloxane) and methylphenylpolysiloxane, and various modified silicone oils such as alkyl-modified, polyether-modified, fluorine-modified, alcohol-modified, amino-modified and epoxy-modified ones; from the viewpoint for the effect as an abrasion resistance improving auxiliary, of these a particularly preferable one is dimethylpolysiloxane. The amount added of the organopolysiloxane is in a range of from 0.1 to 10 parts by weight per 100 parts by weight in total of the components (a), (b), (c) and (d), and in particular from the viewpoint of the modification effect and bleeding, this amount is preferably from 0.2 to 7 parts by weight. Moreover, two or more of such organopolysiloxanes may be used in combination as required.

From the viewpoint of the moldability, the hydrogenated block copolymer composition comprising above components (a), (b), (c) and (d) preferably has a melt flow rate (MFR) at 230° C. and 2.16 kg in a range of from 0.1 to 100 g/10 min, more preferably from 0.1 to 75 g/10 min, particularly preferably from 0.1 to 30 g/10 min.

Moreover, the hydrogenated block copolymer composition of the present invention has an impact resilience at 23° C. of not more than 40%, preferably not more than 35%.

The hydrogenated block copolymer, composition of this hydrogenated block copolymer, or hydrogenated block copolymer composition comprising above components (a), (b), (c) and (d) according to the present invention may have additives included therein as required. There are no particular limitations on the type of such an additive so long as this is one generally used in a thermoplastic resin or rubbery polymer.

Examples are pigments and colorants such as carbon black and titanium oxide, lubricants such as stearic acid, behenic acid, zinc stearate, calcium stearate, magnesium stearate and ethylene bisstearoamide, mold release agents, plasticizers such as a phthalic acid ester type one, an aliphatic ester type one such as an adipic acid ester compound or an azelaic acid ester compound, or a mineral oil, antioxidants such as a hindered phenol type antioxidant or a phosphorus type thermal stabilizer, hindered amine type photostabilizers, benzotriazole type ultraviolet absorbers, antistatic agents, reinforcing agents such as organic fibers, glass fibers, carbon fibers or metal whiskers, and other additives, or a mixture of the above.

The hydrogenated block copolymer composition of the present invention may have a desired filler or flame retardant included therein as required. There are no particular limitations on such a filler or flame retardant so long as this is one generally used in a thermoplastic resin or rubbery polymer.

Examples of fillers include inorganic fillers such as silica, calcium carbonate, magnesium carbonate, magnesium hydroxide, aluminum hydroxide, calcium sulfate, barium sulfate, carbon black, glass fibers, glass beads, glass balloons, glass flakes, graphite, titanium oxide, potassium titanate whiskers, carbon fibers, alumina, kaolin clay, silicic acid, calcium silicate, quartz, mica, talc, clay, zirconia, potassium titanate, alumina, or metal particles, and organic fillers such as wood chips, wood powder, or pulp. There are no particular limitations on the form thereof, which may be flakes, spheres, granules, a powder, or an irregular shape. One of the above may be used alone, or a plurality may be used in combination.

Next, examples of flame retardants include halogen type flame retardants being mainly bromine compounds, phosphorus type flame retardants being mainly aromatic compounds, and inorganic flame retardants being mainly metal hydroxides; inorganic flame retardants have become the mainstream in recent years due to environmental problems and so on, and are thus preferable. Examples of such inorganic flame retardants are mainly water-containing metal compounds and so on such as metal hydroxides such as magnesium hydroxide, aluminum hydroxide and calcium hydroxide, metal oxides such as zinc borate and barium borate, and also calcium carbonate, clay, basic magnesium carbonate and hydrotalcite. In the present invention, of the above flame retardants, from the viewpoint of improving the flame retardancy, a metal hydroxide such as magnesium hydroxide is preferable. Note that among the above flame retardants, there are included so-called auxiliary flame retardants that have a low flame retardancy effect themselves but act synergistically to give an excellent effect when used in combination with another flame retardant.

As a filler or flame retardant, there can also be used a type that is surface-treated in advance with a surface treatment agent such as a silane coupling agent.

Moreover, two or more of the above fillers and flame retardants may be used in combination as required. There are no particular limitations on those used in the case of using in combination, it being possible to use filler components together, or flame retardant components together, or a filler and a flame retardant together.

The hydrogenated block copolymer, composition of this hydrogenated block copolymer, or hydrogenated block copolymer composition comprising above components (a), (b), (c) and (d) according to the present invention may as required also have added thereto any of the additives described in "Gomu/Purasuchikku Haigou Yakuhin (Additives for Rubber and Plastic)" (edited by Rubber Digest Co., Ltd., Japan) or the like, or a mixture thereof.

The hydrogenated block copolymer, composition of this hydrogenated block copolymer, or hydrogenated block copolymer composition comprising above components (a), (b), (c) and (d) according to the present invention may be crosslinked as required. Examples of the crosslinking method include a chemical method in which a crosslinking agent such as a peroxide or sulfur is added and if required also a co-crosslinking agent, and a radiation crosslinking method. Examples of the crosslinking process include a static method, and a dynamic vulcanization method.

Examples of crosslinking agents include organic peroxides, sulfur, phenol type crosslinking agents, isocyanate type crosslinking agents, thiuram type crosslinking agents, and morpholine disulfide; these may be used together with a crosslinking auxiliary, a co-crosslinking agent, a vulcanization accelerator or the like such as stearic acid, oleic acid, zinc stearate, or zinc oxide. Examples of organic peroxide crosslinking agents include hydroperoxides, dialkyl peroxides, diaryl peroxides, diacyl peroxides, peroxyesters, and ketone peroxides. Moreover, a physical crosslinking method using an electron beam, radiation or the like can also be used.

There are no particular limitations on the method of producing the composition of the hydrogenated block copolymer according to the present invention or the hydrogenated block copolymer composition comprising above components (a), (b), (c) and (d), it being possible to use a publicly known method. For example, there can be used a melt-kneading method using an ordinary mixer such as a Banbury mixer, a single-screw extruder, a twin-screw extruder, a co-kneader or a multi-screw extruder, or a method in which the components are dissolved or dispersed and thus mixed together and then the solvent is removed by heating. In the present invention, a melt-kneading method using an extruder is preferable from the viewpoint of productivity and good kneading ability. There are no particular limitations on the form of the hydrogenated copolymer composition obtained, examples including pellets, a sheet, strands, or chips. Moreover, the composition can be made into a molding directly after the melt-kneading.

In the case of obtaining a foam molding from the hydrogenated block copolymer, composition of this hydrogenated block copolymer, or hydrogenated block copolymer composition comprising above components (a), (b), (c) and (d) according to the present invention, a chemical method or a physical method can be used in the present invention; in each of these, bubbles can be distributed through the material by adding a foaming agent such as a chemical foaming agent such as an inorganic foaming agent or an organic foaming agent, or a physical foaming agent. By making into a foamed material, for example the weight can be reduced, the flexibility can be improved, and the designability can be improved. Examples of inorganic foaming agents include sodium hydrogencarbonate, ammonium carbonate, ammonium hydrogencarbonate, ammonium nitrite, azide compounds, sodium borohydride, and metal powders.

Examples of organic foaming agents include azodicarbonamide, azobisformamide, azobisisobutyronitrile, barium azodicarbonate, N,N'-dinitrosopentamethylenetetramine, N,N'-dinitroso-N,N'-dimethylterephthalamide, benzenesulfonyl hydrazide, p-toluenesulfonyl hydrazide, p,p'-oxybisbenzenesulfonyl hydrazide and p-toluenesulfonyl semicarbazide.

Examples of physical foaming agents include a hydrocarbon such as pentane, butane or hexane, a halogenated hydrocarbon such as methyl chloride or methylene chloride, a gas such as nitrogen gas or air, and a fluorinated hydrocarbon such as trichlorofluoromethane, dichlorodifluoromethane, trichlorotrifluoroethane, chlorodifluoroethane or a hydrofluorocarbon.

The molding of the hydrogenated block copolymer, composition of this hydrogenated block copolymer, or hydrogenated block copolymer composition comprising above components (a), (b), (c) and (d) according to the present invention may have the surface thereof printed, coated, embossed or the like as required with an objective of improving the appearance, or improving the weather resistance or scratch resistance. In the case of carrying out surface treatment with an objective of improving the printing or coating ability, there are no particular limitations on the surface treatment method, it being possible to use a physical method or a chemical method; examples include corona discharge treatment, ozone treatment, plasma treatment, flame treatment, and acid/alkali treatment. Of these, corona discharge treatment is preferable from the viewpoint of ease of implementation, cost, it being possible to carry out the treatment continuously, and so on.

The hydrogenated block copolymer, composition of this hydrogenated block copolymer, or hydrogenated block copolymer composition comprising above components (a), (b), (c) and (d) according to the present invention may be used in any of various applications with any of various additives included therein as desired. Specific forms in which the hydrogenated copolymer or hydrogenated copolymer composition of the present invention can be suitably used include (i) a material having a reinforcing filler included therein, (ii) a crosslinked material, (iii) a foam, (iv) a molding such as a multilayer film or multilayer sheet, (v) a building material, (vi) a vibration damping/soundproofing material, (vii) an electric wire coating material, (viii) a high frequency welding composition, (ix) a slush molding material, (x) an adhesive composition, (xi) an asphalt composition, (xii) a medical equipment material, and (xiii) an automobile material.

The hydrogenated block copolymer, composition of this hydrogenated block copolymer, or hydrogenated block copolymer composition comprising above components (a), (b), (c) and (d) according to the present invention can be used in various applications as described above; in the case of use as a molding, the molding method used may be, for example, extrusion molding, injection molding, blow molding, air-pressure molding, vacuum molding, foam molding, multilayer extrusion molding, multilayer injection molding, high frequency weld molding, slush molding, or calender molding. Examples of moldings include a sheet, a film, a tube, a nonwoven fabric or fibrous molding, and a synthetic leather. The molding comprising the hydrogenated copolymer or hydrogenated copolymer composition of the present invention can used as a food packaging material, a medical equipment material, a raw material for household electrical equipment or parts thereof, electronic devices or parts thereof, automobile parts, industrial parts, household goods, or toys, a raw material for footwear, a raw material for fibers, a raw material for an adhesive, or an asphalt modifier. Specific examples of automobile parts include a side mall, a grommet, a knob, a weather strip, a window frame or a sealant therefor, an armrest, a door grip, a steering wheel grip, a console box, a headrest, an instrument panel, a bumper, a spoiler, and an air bag device a storage cover. Specific examples of medical equipment include a blood bag, a blood platelet storage bag, a transfusion (drug solution) bag, a bag for artificial dialysis, medical tubing, and a catheter. Other possible uses include for an industrial or food hose, a vacuum cleaner hose, a cooler packing, a coating material for an electric wire or the like, a coating material for a grip, a soft toy, a substrate for an adhesive tape, sheet or film, a substrate for a surface protection film or an adhesive for such a film, a carpet adhesive, a stretch wrapping film, a heat shrinkable film, a coating material for a coated steel pipe, and a sealant.

Example 1

Following is a more detailed description of the present invention through Examples; however, the present invention is not limited whatsoever by these Examples.

In the following Examples, polymer properties were measured as follows.

I. Characteristics of Hydrogenated Block Copolymer

I-1) Styrene Content of Hydrogenated Block Copolymer

Using the copolymer before hydrogenation, measurement was carried out using an ultraviolet spectrophotometer (made by Shimadzu Corporation, UV-2450).

I-2) Polystyrene Block A Content of Hydrogenated Block Copolymer

Using the copolymer before hydrogenation, measurement was carried out using an osmium tetroxide degradation method described in I. M. Kolthoff et al., J. Polym. Sci. 1, 429 (1946). A 0.1 g osmic acid/125 ml grade tertiary butanol solution was used to decompose the copolymer.

I-3) Vinyl Bond Content of Hydrogenated Block Copolymer

Using the copolymer before hydrogenation, measurement was carried out using an infrared spectrophotometer (made by JASCO Corporation, FT/IR-230). The vinyl bond content of the copolymer was calculated using the Hampton method.

I-4) Molecular Weight and Molecular Weight Distribution of Hydrogenated Block Copolymer Measurement was carried out using GPC (apparatus made by Waters). Tetrahydrofuran was used as a solvent, and a temperature of 35° C. was used as the measurement conditions. The weight average molecular weight was determined using a calibration curve obtained using commercially available standard polystyrenes for which the weight average molecular weight and number average molecular weight were already known. Moreover, the molecular weight distribution is the ratio between the weight average molecular weight (Mw) and the number average molecular weight (Mn).

I-5) Hydrogenation Ratio of Conjugated Diene Monomer Unit Double Bonds in Hydrogenated Block Copolymer Using the hydrogenated copolymer after the hydrogenation, measurement was carried out using a nuclear magnetic resonance apparatus (apparatus name: DPX-400, made by Bruker, Germany).

I-6) Crystallization Peak and Crystallization Peak Heat Quantity

Measurement was carried out using DSC (made by MAC Science, DSC3200S). The temperature was increased from room temperature to 150° C. at a heating rate of 30° C./min, and then decreased to −100° C. at a cooling rate of 10° C./min, so as to measure the crystallization curve, and it was checked whether or not there was a crystallization peak. Moreover, in the case that there was a crystallization peak, the temperature at which this peak arose was taken as the crystallization peak temperature, and the crystallization peak heat quantity was measured.

I-7) Tan □ (Loss Tangent) Peak Temperature

This was Determined by Measuring the Viscoelasticity Spectrum using a viscoelasticity measurement analysis apparatus (made by Rheology, DVE-V4). The measurement frequency was 10 Hz.

II. Properties of Hydrogenated Block Copolymer Composition

II-1) Flexibility

The tensile properties were measured in accordance with JIS K6251. An indicator of the flexibility was taken to be the stress at 100% elongation (hereinafter referred to as "100% Mo". The lower 100% Mo, the better the flexibility. The stretching rate was made to be 500 mm/min, and the measurement temperature 23° C.

II-2) Heat Resistance

A compression set test was carried out in accordance with JIS K6262. The measurement conditions were 22 hours at a temperature of 70° C.

II-3) Abrasion Resistance

Using a JSPS-type rubbing tester (made by Tester Sangyo Co., Ltd., AB-301), the molded sheet surface (leather-grained surface) was rubbed with a calico no. 3 rubbing cloth with a load of 500 g, and judgment was carried out in accordance with the following criteria based on the volume reduction after the rubbing.

⊚: Volume loss not more than 0.01 ml after rubbing 10,000 times

○: Volume loss more than 0.01 ml but not more than 0.1 ml after rubbing 10,000 times Δ: Volume loss more than 0.1 ml but not more than 0.2 ml after rubbing 10,000 times X: Volume loss more than 0.2 ml after rubbing 10,000 times II-4) Processability: Melt Flow Rate (MFR)

This is the melt flow rate at 230° C. and a load of 2.16 kg measured in accordance with JIS K6758.

II-5) Surface Texture

A 2 mm-thick pressed sheet was produced, and evaluation was carried out using the following methods.

Stickiness: The sheet was touched with a finger, and it was checked whether or not there was stickiness.

Oil bleeding: Paper was sandwiched between sheets, and it was checked whether or not oil had been transferred onto the paper after 24 hours.

III. Properties of Composition Comprising Components (A), (B), (C) and (D)

III-1) Fluidity: Melt Flow Rate (MFR)

This melt flow rate was measured at 230° C. and a load of 2.16 kg in accordance with JIS K6758

III-2) Hardness

The value after 10 seconds using a type A durometer was measured in accordance with JIS K6253.

III-3) Tensile Stress, Tensile Strength, and Elongation at Break

These were measured using a no. 3 dumbbell at a crosshead speed of 500 mm/min in accordance with JIS K6251.

III-4) Dunlop Impact Resilience

This was measured at 23° C. in accordance with BS 903.

III-5) Abrasion Resistance 1 (Measurement of Percentage Residual Grain Depth)

Using a JSPS-type abrasion tester (made by Tester Sangyo Co., Ltd., AB-301), the molded sheet surface (leather-grained surface, grain depth approximately 90 μm) was rubbed with a calico no. 3 rubbing cloth with a load of 500 g, the grain depth was measured, and judgment was carried out in accordance with the following criteria based on the percentage residual grain depth (calculated using formula 1 below). The grain depth was measured using an E-35A surface roughness meter made by Tokyo Seimitsu.

$$\text{Percentage residual grain depth} = (\text{grain depth after rubbing})/(\text{grain depth before rubbing}) \times 100 \quad (1)$$

⊚: Percentage residual grain depth not less than 75% after rubbing 20,000 times

○: Percentage residual grain depth less than 75% but not less than 50% after rubbing 20,000 times Δ: Percentage residual grain depth less than 50% but not less than 25% after rubbing 20,000 times X: Percentage residual grain depth less than 25% after rubbing 20,000 times III-6) Abrasion Resistance 2 (Surface State after Rubbing)

The surface of the sheet after the JSPS-type abrasion test of III-5) above was touched with a finger, it was checked whether or not there was stickiness (stickiness), and judgment was carried out in accordance with the following criteria.

○: No stickiness after rubbing completed

X: Was stickiness after rubbing completed

III-7) Surface Texture

A 2 mm-thick pressed sheet was produced, the surface of the sheet was touched with a finger, and it was checked whether or not there was stickiness, judgment being carried out in accordance with the following criteria.
○: Surface of sheet not sticky
X: Surface of sheet sticky
III-8) Oil Absorption A 2 mm-thick pressed sheet was produced, the sheet was immersed in paraffin oil (PW-90, made by Idemitsu Kosan) at 70° C. for 30 days, the weight of the oil absorbed per 100 parts by weight of the sheet was measured, and judgment was carried out in accordance with the following criteria.
○: Weight of absorbed oil not less than 100 parts by weight
X: Weight of absorbed oil less than 100 parts by weight The components used were as follows.
Preparation of Hydrogenation Catalyst A hydrogenation catalyst used in the copolymer hydrogenation in the Examples and Comparative Examples described below was prepared using the following method.

1 liter of dried purified cyclohexane was put into a reaction vessel that had been purged with nitrogen, 100 mmol of bis($\square_5$-cyclopentadienyl)titanium dichloride was added, and then an n-hexane solution containing 200 mmol of trimethylaluminum was added while stirring thoroughly, and reaction was carried out for approximately 3 days at room temperature.

Preparation of Hydrogenated Block Copolymers
Polymer 1:

Batch polymerization was carried out using a tank reactor of internal volume 10 L equipped with a stirrer and a jacket. First, a cyclohexane solution containing 15 parts by weight of styrene (concentration 20 wt %) was put in. Next, 0.06 parts by weight of n-butyllithium per 100 parts by weight of all the monomers, and 0.7 mol of N,N,N',N'-tetramethylethylenediamine (hereinafter referred to as "TMEDA") per 1 mol of the n-butyllithium were added, and polymerization was carried out for 1 hour at 70° C. After that, a cyclohexane solution containing 20 parts by weight of butadiene (concentration 20 wt %) was added, and polymerization was carried out for 1 hour at 70° C. The vinyl bond content of the polybutadiene portion of the polymer sampled at this time was measured to be 50%. Next, a cyclohexane solution containing 14 parts by weight of butadiene and 42 parts by weight of styrene (concentration 20 wt %) was added, and polymerization was carried out for 1 hour at 70° C. The vinyl bond content of the polymer sampled at this time was measured to be 36%. Finally, a cyclohexane solution containing 9 parts by weight of styrene was put in, and polymerization was carried out for 1 hour at 70° C. The polymer obtained had a styrene content of 66 wt %, a polystyrene block content of 30 wt %, a polybutadiene block portion vinyl bond content of 50 wt %, a molecular weight of 188,000, and a molecular weight distribution of 1.1.

Next, the above hydrogenation catalyst was added to the polymer obtained in an amount of 100 ppm in terms of titanium per 100 parts by weight of the polymer, and hydrogenation was carried out at a hydrogen pressure of 0.7 MPa and a temperature of 65° C. After that, methanol was added, and then 0.3 parts by mass of octadecyl-3-(3,5-di-t-butyl-4-hydroxyphenyl) propionate as a stabilizer was added per 100 parts by mass of the polymer.

The hydrogenated copolymer obtained (polymer 1) had a hydrogenation ratio of 98%. The properties of the hydrogenated copolymer obtained are shown in Table 1.

Table 1

TABLE 1

Properties of hydrogenated block copolymers

| | Polystyrene block A content (%) | Random block B | | Conjugated diene block C | | Total styrene content (%) | Weight average molecular weight × 10,000 | Mw/Mn | Hydrogenation ratio (%) |
|---|---|---|---|---|---|---|---|---|---|
| | | content (%) | vinyl bond content (%) | content (%) | vinyl bond content (%) | | | | |
| Polymer 1 | 30 | 50 | 16 | 20 | 50 | 66 | 18.8 | 1.1 | 98 |
| Polymer 2 | 34 | 46 | 15 | 20 | 39 | 68 | 22.2 | 1.1 | 98 |
| Polymer 3 | 40 | 45 | 15 | 15 | 53 | 70 | 19.2 | 1.1 | 99 |
| Polymer 4 | 34 | 41 | 15 | 30 | 48 | 58 | 22.4 | 1.1 | 99 |
| Polymer 5 | 26 | 54 | 16 | 20 | 49 | 65 | 25.0 | 1.2 | 99 |
| Polymer 6 | 20 | 80 | 14 | 0 | — | 67 | 20.0 | 1.9 | 98 |
| Polymer 7 | 30 | 50 | 40 | 20 | 45 | 68 | 21.5 | 1.1 | 98 |
| Polymer 8 | 30 | 64 | 15 | 6 | 49 | 67 | 19.2 | 1.1 | 99 |
| Polymer 9 | 26 | 50 | 14 | 39 | 46 | 52 | 17.6 | 1.1 | 98 |
| Polymer 10 | 30 | 50 | 18 | 20 | 47 | 67 | 19.4 | 1.1 | 98 |
| Polymer 11 | 20 | 80 | 15 | 0 | — | 67 | 19.0 | 1.4 | 99 |
| Polymer 12 | 31 | 0 | — | 69 | — | 31 | 28.0 | 1.1 | 99 |
| Polymer 13 | 29 | 0 | — | 71 | 36 | 29 | 20.2 | 1.1 | 99 | to DSC, whereupon there was no crystallization peak.
Polymer 2:

A polymer was produced as for polymer 1. A cyclohexane solution containing 17 parts by weight of styrene was put in, and then 0.05 parts by weight of n-butyllithium per 100 parts by weight of all the monomers, and 0.65 mol of TMEDA per 1 mol of the n-butyllithium were added, and polymerization was carried out for 1 hour at 70° C. After that, a cyclohexane solution containing 20 parts by weight of butadiene was added, and polymerization was carried out for 1 hour at 70° C. The vinyl bond content of the polybutadiene portion of the polymer sampled at this time was measured to be 39%. Next, a cyclohexane solution containing 12 parts by weight of butadiene and 40 parts by weight of styrene was added, and polymerization was carried out for 1 hour at 70° C. Finally, a cyclohexane solution containing 11 parts by weight of styrene was put in, and polymerization was carried out for 1 hour at 70° C. The polymer obtained had a styrene content of 68 wt %, a polystyrene block content of 34 wt %, a polybutadiene block portion vinyl bond content of 39 wt %, a molecular weight of 222,000, and a molecular weight distribution of 1.1.

Next, the polymer obtained was subjected to hydrogenation using the same method as for polymer 1, whereby a hydrogenated copolymer (polymer 2) was obtained.

The hydrogenated copolymer obtained (polymer 2) had a hydrogenation ratio of 98%.

Polymer 3:

A polymer was produced as for polymer 1. A cyclohexane solution containing 20 parts by weight of styrene was put in, and then 0.06 parts by weight of n-butyllithium per 100 parts by weight of all the monomers, and 0.7 mol of TMEDA per 1 mol of the n-butyllithium were added, and polymerization was carried out for 1 hour at 70° C. After that, a cyclohexane solution containing 15 parts by weight of butadiene was added, and polymerization was carried out for 1 hour at 70° C. The vinyl bond content of the polybutadiene portion of the polymer sampled at this time was measured to be 53%. Next, a cyclohexane solution containing 15 parts by weight of butadiene and 35 parts by weight of styrene was added, and polymerization was carried out for 1 hour at 70° C. Finally, a cyclohexane solution containing 15 parts by weight of styrene was put in, and polymerization was carried out for 1 hour at 70° C. The polymer obtained had a styrene content of 70 wt %, a polystyrene block content of 40 wt %, a polybutadiene block portion vinyl bond content of 53 wt %, a molecular weight of 192,000, and a molecular weight distribution of 1.1.

Next, the polymer obtained was subjected to hydrogenation using the same method as for polymer 1, whereby a hydrogenated copolymer (polymer 3) was obtained. The hydrogenated copolymer obtained (polymer 3) had a hydrogenation ratio of 99%.

Polymer 4:

A polymer was produced as for polymer 1. A cyclohexane solution containing 17 parts by weight of styrene was put in, and then 0.05 parts by weight of n-butyllithium per 100 parts by weight of all the monomers, and 0.7 mol of TMEDA per 1 mol of the n-butyllithium were added, and polymerization was carried out for 1 hour at 70° C. After that, a cyclohexane solution containing 30 parts by weight of butadiene was added, and polymerization was carried out for 1 hour at 70° C. The vinyl bond content of the polybutadiene portion of the polymer sampled at this time was measured to be 48%. Next, a cyclohexane solution containing 12 parts by weight of butadiene and 28 parts by weight of styrene was added, and polymerization was carried out for 1 hour at 70° C. The vinyl bond content of the polymer sampled at this time was measured to be 39%. Finally, a cyclohexane solution containing 13 parts by weight of styrene was put in, and polymerization was carried out for 1 hour at 70° C. The polymer obtained had a styrene content of 58 wt %, a polystyrene block content of 34 wt %, a polybutadiene block portion vinyl bond content of 48 wt %, a molecular weight of 224,000, and a molecular weight distribution of 1.1.

Next, the polymer obtained was subjected to hydrogenation using the same method as for polymer 1, whereby a hydrogenated copolymer (polymer 4) was obtained. The hydrogenated copolymer obtained (polymer 4) had a hydrogenation ratio of 99%.

Polymer 5:

Batch polymerization was carried out using a tank reactor of internal volume 10 L equipped with a stirrer and a jacket. First, a cyclohexane solution containing 15 parts by weight of styrene (concentration 20 wt %) was put in. Next, 0.04 parts by weight of n-butyllithium per 100 parts by weight of all the monomers, and 0.7 mol of TMEDA per 1 mol of the n-butyllithium were added, and polymerization was carried out for 1 hour at 70° C. After that, a cyclohexane solution containing 20 parts by weight of butadiene (concentration 20 wt %) was added, and polymerization was carried out for 1 hour at 70° C. The vinyl bond content of the polybutadiene portion of the polymer sampled at this time was measured to be 50%. Next, a cyclohexane solution containing 15 parts by weight of butadiene and 41 parts by weight of styrene (concentration 20 wt %) was added, and polymerization was carried out for 1 hour at 70° C. The vinyl bond content of the polymer sampled at this time was measured to be 36%. Finally, a cyclohexane solution containing 9 parts by weight of styrene was put in, and polymerization was carried out for 1 hour at 70° C.

The polymer obtained had a styrene content of 65 wt %, a polystyrene block content of 26 wt %, a polybutadiene block portion vinyl bond content of 49 wt %, a weight average molecular weight of 250,000, and a molecular weight distribution of 1.2.

Next, the polymer obtained was subjected to hydrogenation using the same method as for polymer 1, whereby a hydrogenated block copolymer (polymer 5) was obtained. The hydrogenated block copolymer obtained had a hydrogenation ratio of 99%. Moreover, the hydrogenated block copolymer obtained was subjected to DSC, whereupon there was no crystallization peak.

Polymer 6:

Continuous polymerization was carried out using two tank reactors each of internal volume 10 L equipped with a stirrer and a jacket. Fed in from the bottom of the first reactor were a cyclohexane solution having a butadiene concentration of 24 wt % at a feed rate of 4.51 L/hr, a cyclohexane solution having a styrene concentration of 24 wt % at a feed rate of 5.97 L/hr, a cyclohexane solution having a n-butyllithium concentration adjusted to 0.077 g per 100 g of the monomers at 2.0 L/hr, and a cyclohexane solution of TMEDA at a feed rate such as to be 0.44 mol per 1 mol of the n-butyllithium, and continuous polymerization was carried out at 90° C. The reaction temperature was adjusted through the jacket temperature, the temperature in the vicinity of the bottom of the reactor being approximately 88° C., and the temperature in the vicinity of the top of the reactor being approximately 90° C. The average residence time in the polymerization reactor was approximately 45 minutes, and the butadiene conversion ratio was substantially 100%, while the styrene conversion ratio was 99%.

A polymer solution withdrawn from the first reactor was fed into the second reactor from the bottom of the second reactor, and moreover at the same time a cyclohexane solution having a styrene concentration of 24 wt % was fed into the bottom of the second reactor at a feed rate of 2.38 L/hr, and continuous polymerization was carried out at 90° C. The styrene conversion ratio at an outlet of the second reactor was 98%.

The polymer obtained through the continuous polymerization was analyzed, and found to have a styrene content of 67 wt %, a polystyrene block content of 20 wt %, a vinyl bond content in the butadiene portion of the random block portion of 14 wt %, a weight average molecular weight of 200,000, and a molecular weight distribution of 1.9.

Next, the polymer obtained was subjected to hydrogenation using the same method as for polymer 1, whereby a hydrogenated copolymer (polymer 6) was obtained. The hydrogenated copolymer obtained had a hydrogenation ratio of 99%.

Polymer 7:

Batch polymerization was carried out using a tank reactor of internal volume 10 L equipped with a stirrer and a jacket. First, a cyclohexane solution containing 16 parts by weight of styrene (concentration 20 wt %) was put in. Next, 0.058 parts by weight of n-butyllithium per 100 parts by weight of all the monomers, and 0.7 mol of N,N,N',N'-tetramethylethylenediamine (hereinafter referred to as "TMEDA") per 1 mol of the n-butyllithium were added, and polymerization was carried out for 1 hour at 70° C. After that, a cyclohexane solution containing 20 parts by weight of butadiene (concentration 20 wt %) was added, and polymerization was carried out for 1 hour at 70° C. The vinyl bond content of the polybutadiene portion of the polymer sampled at this time was measured to be 50%. Next, a cyclohexane solution containing 14 parts by weight of butadiene and 42 parts by weight of styrene (concentration 20 wt %) was added, and polymerization was carried out for 1 hour at 30° C. Finally, a cyclohexane solution containing 10 parts by weight of styrene was put in, and polymerization was carried out for 1 hour at 70° C. The polymer obtained had a styrene content of 68 wt %, a polystyrene block content of 30 wt %, a polybutadiene block portion vinyl bond content of 45 wt %, a molecular weight of 215,000, and a molecular weight distribution of 1.1. Next, the polymer obtained was subjected to hydrogenation using the same method as for polymer 1, whereby a hydrogenated block copolymer (polymer 7) was obtained. The hydrogenated block copolymer obtained had a hydrogenation ratio of 98%.

Polymer 8:

A polymer was produced as for polymer 1. First, a cyclohexane solution containing 15 parts by weight of styrene was put in, and then 0.06 parts by weight of n-butyllithium per 100 parts by weight of all the monomers, and 0.07 mol of TMEDA per 1 mol of the n-butyllithium were added, and polymerization was carried out for 1 hour at 70° C. After that, a cyclohexane solution containing 6 parts by weight of butadiene was added, and polymerization was carried out for 1 hour at 70° C. Next, a cyclohexane solution containing 27 parts by weight of butadiene and 43 parts by weight of styrene was added, and polymerization was carried out for 1 hour at 70° C. Finally, a cyclohexane solution containing 9 parts by weight of styrene was put in, and polymerization was carried out for 1 hour at 70° C. The polymer obtained had a styrene content of 67 wt %, a polystyrene block content of 30 wt %, a polybutadiene block portion vinyl bond content of 49 wt %, a molecular weight of 192,000, and a molecular weight distribution of 1.1.

Next, the polymer obtained was subjected to hydrogenation using the same method as for polymer 1, whereby a hydrogenated copolymer (polymer 8) was obtained.

The hydrogenated copolymer obtained (polymer 8) had a hydrogenation ratio of 99%.

Polymer 9:

A polymer was produced as for polymer 1. A cyclohexane solution containing 14 parts by weight of styrene was put in, and then 0.065 parts by weight of n-butyllithium per 100 parts by weight of all the monomers, and 0.65 mol of TMEDA per 1 mol of the n-butyllithium were added, and polymerization was carried out for 1 hour at 70° C. After that, a cyclohexane solution containing 40 parts by weight of butadiene was added, and polymerization was carried out for 1 hour at 70° C. The vinyl bond content of the polybutadiene portion of the polymer sampled at this time was measured to be 39%. Next, a cyclohexane solution containing 9 parts by weight of butadiene and 29 parts by weight of styrene was added, and polymerization was carried out for 1 hour at 70° C. Finally, a cyclohexane solution containing 9 parts by weight of styrene was put in, and polymerization was carried out for 1 hour at 70° C. The polymer obtained had a styrene content of 52 wt %, a polystyrene block content of 26 wt %, a polybutadiene block portion vinyl bond content of 46 wt %, a molecular weight of 176,000, and a molecular weight distribution of 1.1.

Next, the polymer obtained was subjected to hydrogenation using the same method as for polymer 1, whereby a hydrogenated copolymer (polymer 9) was obtained.

The hydrogenated copolymer obtained (polymer 9) had a hydrogenation ratio of 98%.

Polymer 10:

Batch polymerization was carried out using a tank reactor of internal volume 10 L equipped with a stirrer and a jacket. First, a cyclohexane solution containing 30 parts by weight of styrene (concentration 20 wt %) was put in. Next, 0.06 parts by weight of n-butyllithium per 100 parts by weight of all the monomers, and 0.7 mol of N,N,N',N'-tetramethylethylenediamine (hereinafter referred to as "TMEDA") per 1 mol of the n-butyllithium were added, and polymerization was carried out for 1.2 hours at 70° C. After that, a cyclohexane solution containing 20 parts by weight of butadiene (concentration 20 wt %) was added, and polymerization was carried out for 1 hour at 70° C. The vinyl bond content of the polybutadiene portion of the polymer sampled at this time was measured to be 50%. Next, a cyclohexane solution containing 13 parts by weight of butadiene and 37 parts by weight of styrene (concentration 20 wt %) was added, and polymerization was carried out for 1 hour at 70° C. The polymer obtained had a styrene content of 67 wt %, a polystyrene block content of 30 wt %, a polybutadiene block portion vinyl bond content of 47 wt %, a molecular weight of 194,000, and a molecular weight distribution of 1.1.

Next, the polymer obtained was subjected to hydrogenation using the same method as for polymer 1, whereby a hydrogenated copolymer (polymer 10) was obtained.

The hydrogenated copolymer obtained (polymer 10) had a hydrogenation ratio of 98%.

Polymer 11:

Batch polymerization was carried out using a tank reactor of internal volume 10 L equipped with a stirrer and a jacket. First, a cyclohexane solution containing 20 parts by weight of styrene (concentration 20 wt %) was put in. Next, 0.09 parts by weight of n-butyllithium per 100 parts by weight of all the monomers, and 0.7 mol of TMEDA per 1 mol of the n-butyllithium were added, and polymerization was carried out for 30 minutes at 70° C. Next, a cyclohexane solution containing 33 parts by weight of butadiene and 47 parts by weight of styrene (concentration 20 wt %) was added, and polymerization was carried out for 1 hour at 70° C. Next, ethyl benzoate as a coupling agent was reacted with the living copolymer obtained in an amount of 0.5 mol relative to the n-butyllithium used in the polymerization. The polymer obtained had a styrene content of 67 wt %, a polystyrene block content of 20 wt %, a weight average molecular weight of 190,000, and a molecular weight distribution of 1.4.

Next, the polymer obtained was subjected to hydrogenation using the same method as for polymer 1, whereby a hydrogenated block copolymer (polymer 11) was obtained. The hydrogenated copolymer obtained (polymer 11) had a hydrogenation ratio of 99%.

Polymer 12:

SEBS: A commercially available hydrogenated block copolymer (Kraton G1651, made by Kraton Polymers) was used.

Polymer 13:

Batch polymerization was carried out using a tank reactor of internal volume 10 L equipped with a stirrer and a jacket. First, a cyclohexane solution containing 15 parts by weight of styrene (concentration 12 wt %) was put in. Next, 0.055 parts by weight of n-butyllithium per 100 parts by weight of all the monomers, and 0.3 mol of TMEDA per 1 mol of the n-butyllithium were added. Next, a cyclohexane solution containing 71 parts by weight of butadiene (concentration 12 wt %) was added and polymerization was carried out, and then finally a cyclohexane solution containing 14 parts by weight of styrene (concentration 12 wt %) was put in and polymerization was carried out. The polymerization temperature was controlled to be in a range of from 40 to 80° C. The polymer obtained had a styrene content of 29 wt %, a weight average molecular weight of 202,000, and a molecular weight distribution of 1.1.

Next, the polymer obtained was subjected to hydrogenation using the same method as for polymer 1, whereby a hydrogenated copolymer (polymer 13) was obtained. The hydrogenated copolymer obtained (polymer 13) had a hydrogenation ratio of 99%.

Component (B):

Batch polymerization was carried out using a tank reactor of internal volume 10 L equipped with a stirrer and a jacket. First, a cyclohexane solution containing 16 parts by weight of styrene (concentration 12 wt %) was put in. Next, 0.04 parts by weight of n-butyllithium per 100 parts by weight of all the monomers, and 0.3 mol of TMEDA per 1 mol of the n-butyllithium were added. Next, a cyclohexane solution containing 68 parts by weight of butadiene (concentration 12 wt %) was added and polymerization was carried out, and then finally a cyclohexane solution containing 16 parts by weight of styrene (concentration 12 wt %) was put in and polymerization was carried out. The polymerization temperature was controlled to be in a range of from 40 to 80° C. The polymer obtained had a styrene content of 32 wt %, a butadiene portion vinyl bond content of 37 wt %, a weight average molecular weight of 280,000, a molecular weight distribution of 1.05, and a polystyrene block content of 97 wt %.

Next, the polymer obtained was subjected to hydrogenation using the same method as for component (a)-1, whereby a hydrogenated block copolymer was obtained. The hydrogenated block copolymer obtained had a hydrogenation ratio of 99%.

Component (C):
  Thermoplastic resin: polypropylene resin, PC630A (made by SunAllomer), MFR (230° C., 2.16 kg): 7.5 g/10 min Component (D):
  Rubber-softening agent:
    Oil 1) Paraffin oil (PW-90, made by Idemitsu Kosan)
    Oil 2) Paraffin oil (PW-380, made by Idemitsu Kosan)

Component (E):
  Silicone oil: SH200 5000 cs (made by Dow Corning Toray)

Examples 1 to 5

A hydrogenated copolymer obtained (one of polymers 1 to 4) was powdered, and then an oil having a composition as shown in Table 2 was absorbed therein over 24 hours. After that, kneading was carried out using a twin-screw extruder (PCM30), and pelletizing was carried out so as to obtain a copolymer composition. The extrusion conditions were a cylinder temperature of 220° C., and a screw rotational speed of 300 rpm. Each composition obtained was subjected to compression molding at 200° C., so as to produce a 2 mm-thick sheet, whereby a property measurement test piece was obtained.

The properties of each test piece were measured. The results are shown in Table 2.

Table 2:

TABLE 2

Properties of hydrogenated block copolymer compositions - 1

| | Example 1 | Example 2 | Example 3 | Example 4 | Example 5 | Comparative Example 1 | Comparative Example 2 | Comparative Example 3 |
|---|---|---|---|---|---|---|---|---|
| Polymer | Polymer 1 | Polymer 2 | Polymer 2 | Polymer 3 | Polymer 4 | Polymer 6 | Polymer 6 | Polymer 10 |
| Polymer content (parts by weight) | 100 | 100 | 100 | 100 | 100 | 100 | 100 | 100 |
| Oil | Oil 1 | Oil 1 | Oil 1 | Oil 2 | Oil 2 | — | Oil 1 | Oil 1 |
| Oil content (parts by weight) | 30 | 30 | 50 | 30 | 30 | 0 | 30 | 30 |
| PP content (parts by weight) | 0 | 0 | 0 | 0 | 0 | 0 | 0 | 0 |
| Flexibility 100% Mo(kg/cm2) | 26 | 32 | 14 | 38 | 22 | 50 | 5 | 43 |
| Heat resistance 70° C. C-set (%) | 74 | 68 | 66 | 64 | 72 | 100 | 100 | 90 |
| Abrasion resistance: JSPS abrasion test | ◎ | ◎ | ○ | ◎ | ◎ | ◎ | X | ◎ |
| Processability MFR(g/10 min) | 2 | 1.2 | 7 | 3.2 | 4 | 2.1 | 30 | 58 |
| Surface texture stickiness/ oil bleeding | No/No | No/No | No/No | No/No | No/No | — | Yes/Yes | Yes/No |

| | Comparative Example 4 | Comparative Example 5 | Comparative Example 6 | Comparative Example 7 | Comparative Example 8 |
|---|---|---|---|---|---|
| Polymer | Polymer 7 | Polymer 8 | Polymer 9 | Polymer 12 | Polymer 13 |
| Polymer content (parts by weight) | 100 | 100 | 100 | 100 | 100 |
| Oil | Oil 1 | Oil 1 | Oil 1 | Oil 1 | Oil 1 |
| Oil content (parts by weight) | 30 | 30 | 30 | 30 | 30 |
| PP content (parts by weight) | 0 | 0 | 0 | 0 | 0 |
| Flexibility 100% Mo(kg/cm2) | 20 | 19 | 14 | Molding Impossible | 12 |
| Heat resistance 70 C. C-set (%) | 70 | 83 | 71 | | 66 |
| Abrasion resistance: JSPS abrasion test | X | ◎ | Δ~○ | | X |

TABLE 2-continued

| Properties of hydrogenated block copolymer compositions - 1 | | | | |
|---|---|---|---|---|
| Processability MFR(g/10 min) | 41 | 2.5 | 1.6 | 0.3 |
| Surface texture stickiness/ oil bleeding | No/No | Yes/Yes | Yes/No | Yes/No |

Comparative Example 1

Polymer 5 was subjected to compression molding at 200° C., so as to produce a 2 mm-thick molded sheet, and the properties were measured.

Comparative Example 2

Using polymer 5, a composition was obtained and a molded sheet was produced as in the Examples, and the properties were measured.

Comparative Examples 3 to 6 and 8

Using each of polymers 7 to 10 and 13, a composition was obtained and a molded sheet was produced as in the Examples, and the properties were measured.

Comparative Example 7

Using polymer 12, a composition was obtained as in the Examples; however, a molded sheet could not be produced.

Examples 6 to 8

Polymer 1 as a hydrogenated block copolymer was powdered, and then components as shown in Table 3 were mixed together using a Henschel mixer, and melt-kneading was carried out at 230° C. using a 30 mm-diameter twin-screw extruder, thus obtaining pellets of the composition. The pellets of the composition were then further rolled out at 200° C. using a 3.5-inch roller, and then pressing was carried out at 200° C. and 100 kg/cm² using a hydraulic press, so as to produce a 2 mm-thick molded sheet. The properties thereof are shown in Table 3.

Table 3:

TABLE 3

| Properties of hydrogenated block copolymer compositions - 2 | | | | | | | | | |
|---|---|---|---|---|---|---|---|---|---|
| | | Example 6 | Example 7 | Example 8 | Example 9 | Comparative Example 9 | Comparative Example 10 | Comparative Example 11 | Comparative Example 12 |
| Composition | Polymer 1 | 50 | 50 | 50 | — | — | — | — | 100 |
| | Polymer 5 | — | — | — | 50 | — | — | — | — |
| | Polymer 6 | — | — | — | — | — | — | — | — |
| | Polymer 11 | — | — | — | — | — | — | — | — |
| | Component (b) | 50 | 50 | 50 | 50 | 100 | 100 | 100 | — |
| | Component (c) | 20 | 40 | 40 | 40 | 20 | 40 | 40 | 20 |
| | Component (d): Oil 2 | 40 | 40 | 80 | 80 | 40 | 40 | 80 | 40 |
| | Component (e) | 1.6 | 1.8 | 2.2 | 2.2 | 1.6 | 1.8 | 2.2 | 1.6 |
| Basic Properties | MFR(230° C., 2.16 kg)(g/10 min) | 0.11 | 0.52 | 5.10 | 1.90 | 0 | 0 | 0.03 | 5.20 |
| | Hardness (after 10 s) (—) | 70 | 81 | 68 | 70 | 65 | 78 | 65 | 68 |
| | 100Mo(kg/cm2) | 30 | 48 | 28 | 30 | 20 | 34 | 21 | 38 |
| | 200Mo(kg/cm2) | 40 | 58 | 36 | 37 | 28 | 42 | 26 | 50 |
| | 300Mo(kg/cm2) | 51 | 70 | 45 | 46 | 36 | 52 | 34 | 65 |
| | TB(kg/cm2) | 273 | 287 | 176 | 178 | 258 | 291 | 230 | 188 |
| | EB (%) | 710 | 690 | 730 | 710 | 740 | 730 | 820 | 580 |
| | Impact resilience (%) | 12.5 | 14.7 | 15.9 | 16.3 | 56.5 | 44.8 | 41.3 | 8.6 |
| | 70° C. C-Set (%) | 58 | 60 | 58 | 53 | 36 | 41 | 40 | 78 |
| JSPS abrasion | Percentage residual grain depth | ○ | ◎ | ○ | ◎ | X | Δ | X | ○ |
| | Surface state after rubbing | ○ | ○ | ○ | ○ | X | X | X | ○ |
| Surface texture | | ○ | ○ | ○ | ○ | X | X | X | ○ |

| | | Comparative Example 13 | Comparative Example 14 | Comparative Example 15 | Comparative Example 16 | Comparative Example 17 | Comparative Example 18 |
|---|---|---|---|---|---|---|---|
| Composition | Polymer 1 | 100 | 100 | — | — | — | — |
| | Polymer 5 | — | — | — | — | — | — |
| | Polymer 6 | — | — | 100 | 50 | — | — |
| | Polymer 11 | — | — | — | — | 100 | 50 |
| | Component (b) | — | — | — | 50 | — | 50 |
| | Component (c) | 40 | 40 | 40 | 40 | 40 | 40 |
| | Component (d): Oil 2 | 40 | 80 | 40 | 40 | 40 | 40 |
| | Component (e) | 1.8 | 2.2 | 1.8 | 1.8 | 1.8 | 1.8 |
| Basic Properties | MFR(230° C., 2.16 kg)(g/10 min) | 5.90 | 50.60 | 31.6 | 3.9 | 32.4 | 4.2 |
| | Hardness (after 10 s) (—) | 82 | 67 | 70 | 74 | 70 | 74 |
| | 100Mo(kg/cm2) | 63 | 33 | 39 | 37 | 38 | 38 |

TABLE 3-continued

Properties of hydrogenated block copolymer compositions - 2

|  |  |  |  |  |  |  |  |
|---|---|---|---|---|---|---|---|
|  | 200Mo(kg/cm2) | 76 | 42 | 43 | 43 | 47 | 48 |
|  | 300Mo(kg/cm2) | 92 | 51 | 47 | 51 | 57 | 58 |
|  | TB(kg/cm2) | 188 | 82 | 58 | 93 | 160 | 212 |
|  | EB (%) | 510 | 440 | 520 | 630 | 600 | 660 |
|  | Impact resilience (%) | 11.0 | 12.2 | 36.7 | 36.7 | 26.7 | 29.2 |
|  | 70° C. C-Set (%) | 77 | 82 | 83 | 78 | 85 | 77 |
| JSPS abrasion | Percentage residual grain depth | ⊚ | X | X | Δ | X | Δ |
|  | Surface state after rubbing | ○ | ○ | ○ | ○ | ○ | ○ |
| Surface texture |  | ○ | ○ | ○ | ○ | ○ | ○ |

Example 9

Polymer 5 as a hydrogenated block copolymer was powdered, and then a 2 mm-thick molded sheet was produced from components as shown in Table 3 using the same method as for Examples 1 to 3. The properties thereof are shown in Table 3.

Comparative Examples 9 to 18

Polymer 1, polymer 6 or polymer 11 as a hydrogenated block copolymer, and component (b) were powdered, and then components as shown in Table 3 were mixed together using a Henschel mixer, and melt-kneading was carried out at 230° C. using a 30 mm-diameter twin-screw extruder, thus obtaining pellets of the composition. Using the composition, a 2 mm-thick molded sheet was produced using the same method as for Examples 1 to 3. The properties thereof are shown in Table 3.

Examples 10 and 11

Polymer 1 or polymer 5 as a hydrogenated block copolymer was powdered, then rolling out was carried out at 200° C. using a 3.5-inch roller, and then pressing was carried out at 220° C. and 100 kg/cm² using a hydraulic press, so as to produce a 2 mm-thick molded sheet. The oil absorption thereof is shown in Table 4.
Table 4:

TABLE 4

Oil absorption of hydrogenated block copolymers

|  | Example 10 | Example 11 | Comparative Example 19 | Comparative Example 20 |
|---|---|---|---|---|
| Component | Polymer 1 | Polymer 5 | Polymer 6 | Polymer 11 |
| Oil absorption | ○ | ○ | X | X |

Comparative Examples 19 and 20

Polymer 6 or polymer 11 as a hydrogenated block copolymer was powdered, then rolling out was carried out at 200° C. using a 3.5-inch roller, and then pressing was carried out at 210° C. and 100 kg/cm² using a hydraulic press, so as to produce a 2 mm-thick molded sheet. The oil absorption thereof is shown in Table 4.

A hydrogenated copolymer of the present invention and a composition thereof have excellent flexibility, heat resistance, abrasion resistance and surface texture (no stickiness, oil bleeding etc.) and good processability, and can thus be used as an alternative material to a soft vinyl chloride resin.

Utilizing these characteristic features, processing can be carried out into moldings of any of various forms by injection molding, extrusion molding or the like, use being possible for automobile parts (as an internal automobile material or an external automobile material), a medical equipment material, any of various containers such as food packaging containers, household electrical equipment, industrial parts, toys and so on.

We claim:

1. A hydrogenated block copolymer that is a hydrogenated material of a copolymer comprising a conjugated diene and a vinyl aromatic compound, and has following properties (1) to (6):
   (1) the hydrogenated block copolymer has therein at least one of each of following polymer blocks a, b, and c:
   a. a vinyl aromatic compound polymer block A,
   b. a hydrogenated polymer block B of a random copolymer comprising a conjugated diene and a vinyl aromatic compound, and
   c. a hydrogenated polymer block C of a conjugated diene homopolymer having a vinyl bond content of not less than 30% obtained by adding conjugated diene monomers to a product of a polymerization of at least one of polymer blocks a and b;
   (2) the hydrogenated block copolymer has a vinyl aromatic compound content of more than 58 wt % and less than 95 wt %;
   (3) the hydrogenated block copolymer has a weight average molecular weight in a range of from 50,000 to 1,000,000;
   (4) a vinyl bond content of conjugated diene monomer units constituting a polymer of the hydrogenated polymer block B before hydrogenation is not less than 10% and less than 20%;
   (5) a double bond hydrogenation ratio of the conjugated diene monomer units is not less than 75%; and
   (6) the hydrogenated block copolymer has the vinyl aromatic compound polymer block A content in a range of from 25 to 50 wt %, the hydrogenated copolymer block B content in a range of from 30 to 80 wt %, and the hydrogenated polymer block C content in a range of from 10 to 35 wt %.

2. The hydrogenated block copolymer according to claim 1, wherein the hydrogenated polymer block C content is in a range of from 10 to 30 wt %.

3. The hydrogenated block copolymer according to claim 1, having therein at least two of the vinyl aromatic compound polymer blocks A.

4. The hydrogenated block copolymer according to claim 3, having the vinyl aromatic compound polymer blocks A at each end thereof.

5. The hydrogenated block copolymer according to claim 1, wherein the hydrogenated block copolymer is further bonded to a functional group-containing atomic group.

6. A hydrogenated block copolymer composition comprising (1) 100 parts by weight of the hydrogenated block copolymer according to claim 1, and (2) from 5 to 100 parts by weight of a rubber-softening agent.

7. The hydrogenated block copolymer composition according to claim 6, wherein there is at least one tan δ (loss tangent) peak in a range of from 0 to 40° C. in a viscoelasticity measurement chart obtained for the hydrogenated block copolymer composition.

8. A hydrogenated block copolymer composition comprising (1) 100 parts by weight of the hydrogenated block copolymer according to a claim 1, (2) from 5 to 100 parts by weight of a rubber-softening agent, and (3) from 5 to 100 parts by weight of a thermoplastic resin and/or a rubbery polymer.

9. A hydrogenated block copolymer composition comprising:
   (a) the hydrogenated block copolymer according to claim 1 as a first material;
   (b) a second material formed of a hydrogenated block copolymer that is obtained by hydrogenating a block copolymer comprising at least two polymer blocks D composed mainly of a vinyl aromatic compound and at least one polymer block E composed mainly of a conjugated diene, and that has following properties (7) to (9):
   (7) the hydrogenated block copolymer of the second material has a total vinyl aromatic compound content in a range of from 10 to 40 wt %, and a proportion of the polymer blocks D composed mainly of the vinyl aromatic compound out of the total vinyl aromatic compound content is not less than 80 wt %;
   (8) the hydrogenated block copolymer of the second material has a weight average molecular weight in a range of from 200,000 to 600,000; and
   (9) not less than 75% of double bonds of the conjugated diene monomer unit in the hydrogenated block copolymer of the second material are hydrogenated;
   (c) a thermoplastic resin; and
   (d) a rubber softening agent;
   wherein, relative to 100 parts by weight in total of the components (a) and (b), the component (c) content is in a range of from 20 to 200 parts by weight, and the rubber softening agent content is in a range of from 20 to 250 parts by weight.

10. The hydrogenated block copolymer composition according to claim 9, wherein the thermoplastic resin comprises at least one polyolefin resin.

11. The hydrogenated block copolymer composition according to claim 9, further comprising from 0.1 to 10 parts by weight of an organopolysiloxane per 100 parts by weight of the hydrogenated block copolymer composition.

12. The hydrogenated block copolymer composition according to claim 11, wherein the organopolysiloxane is a liquid polydimethylsiloxane, and has a kinematic viscosity at 25° C. of not less than 90 cst.

13. The hydrogenated block copolymer composition according to claim 9, having an MFR at 230° C. and 2.16 kg in a range of from 0.1 to 100 g/10 min, and an impact resilience at 23° C. of not more than 40%.

14. The hydrogenated block copolymer according to claim 2, having therein at least two of the vinyl aromatic compound polymer blocks A.

15. The hydrogenated block copolymer according to claim 14, having the vinyl aromatic compound polymer blocks A at each end thereof.

16. The hydrogenated block copolymer according to claim 15, wherein the hydrogenated block copolymer is further bonded to a functional group-containing atomic group.

17. A hydrogenated block copolymer composition comprising (1) 100 parts by weight of the hydrogenated block copolymer according to claim 16, and (2) from 5 to 100 parts by weight of a rubber-softening agent.

18. The hydrogenated block copolymer composition according to claim 17, wherein there is at least one tan δ (loss tangent) peak in a range of from 0 to 40° C. in a viscoelasticity measurement chart obtained for the hydrogenated block copolymer composition.

19. A hydrogenated block copolymer composition comprising (1) 100 parts by weight of the hydrogenated block copolymer according to claim 16, (2) from 5 to 100 parts by weight of a rubber-softening agent, and (3) from 5 to 100 parts by weight of a thermoplastic resin and/or a rubbery polymer.

20. A hydrogenated block copolymer composition comprising:
   (a) the hydrogenated block copolymer according to claim 16 as a first material;
   (b) a second material formed of a hydrogenated block copolymer that is obtained by hydrogenating a block copolymer comprising at least two polymer blocks D composed mainly of a vinyl aromatic compound and at least one polymer block E composed mainly of a conjugated diene, and that has following properties (7) to (9):
   (7) the hydrogenated block copolymer of the second material has a total vinyl aromatic compound content in a range of from 10 to 40 wt %, and a proportion of the polymer blocks D composed mainly of the vinyl aromatic compound out of the total vinyl aromatic compound content is not less than 80 wt %;
   (8) the hydrogenated block copolymer of the second material has a weight average molecular weight in a range of from 200,000 to 600,000; and
   (9) not less than 75% of double bonds of the conjugated diene monomer unit in the hydrogenated block copolymer of the second material are hydrogenated;
   (c) a thermoplastic resin; and
   (d) a rubber softening agent;
   wherein, relative to 100 parts by weight in total of the components (a) and (b), the component (c) content is in a range of from 20 to 200 parts by weight, and the rubber softening agent content is in a range of from 20 to 250 parts by weight.

21. The hydrogenated block copolymer composition according to claim 20, wherein the thermoplastic resin comprises at least one polyolefin resin.

22. The hydrogenated block copolymer composition according to claim 21, further comprising from 0.1 to 10 parts by weight of an organopolysiloxane per 100 parts by weight of the hydrogenated block copolymer composition.

23. The hydrogenated block copolymer composition according to claim 22, wherein the organopolysiloxane is a liquid polydimethylsiloxane, and has a kinematic viscosity at 25° C. of not less than 90 cst.

24. The hydrogenated block copolymer composition according to claim 23, having an MFR at 230° C. and 2.16 kg in a range of from 0.1 to 100 g/10 min, and an impact resilience at 23° C. of not more than 40%.

* * * * *